(12) United States Patent
Contillo et al.

(10) Patent No.: US 11,064,665 B2
(45) Date of Patent: Jul. 20, 2021

(54) PLANT CONTAINMENT SYSTEM HAVING TWO-POSITION VALVE

(71) Applicants: Lawrence J. Contillo, Weaverville, NC (US); Felipe Grabiel, Miami, FL (US); Michael Rimland, Miami, FL (US); Anthony Visser, 's-Gravendeel (NL)

(72) Inventors: Lawrence J. Contillo, Weaverville, NC (US); Felipe Grabiel, Miami, FL (US); Michael Rimland, Miami, FL (US); Anthony Visser, 's-Gravendeel (NL)

(73) Assignee: Costa Farms, LLC, Miami, FL (US)

( * ) Notice: Subject to any disclaimer, the term of this patent is extended or adjusted under 35 U.S.C. 154(b) by 304 days.

(21) Appl. No.: 15/676,267

(22) Filed: Aug. 14, 2017

(65) Prior Publication Data

US 2017/0359977 A1    Dec. 21, 2017

Related U.S. Application Data

(63) Continuation-in-part of application No. 13/868,606, filed on Apr. 23, 2013, now abandoned.

(51) Int. Cl.
| | |
|---|---|
| *A01G 27/04* | (2006.01) |
| *A01G 27/06* | (2006.01) |
| *A01G 9/02* | (2018.01) |
| *A01G 9/00* | (2018.01) |
| *A01G 9/04* | (2006.01) |
| *A01G 27/00* | (2006.01) |

(52) U.S. Cl.
CPC ............... *A01G 27/06* (2013.01); *A01G 9/02* (2013.01); *A01G 9/006* (2013.01); *A01G 9/045* (2013.01); *A01G 9/047* (2013.01); *A01G 27/008* (2013.01)

(58) Field of Classification Search
CPC ........ A01G 27/00; A01G 27/04; A01G 27/06; A01G 9/00; A01G 9/04; A01G 9/042; A01G 9/02; A01G 9/021
See application file for complete search history.

(56) References Cited

U.S. PATENT DOCUMENTS

| | | | | |
|---|---|---|---|---|
| 3,724,756 A | * | 4/1973 | Maltenfort ............. | B65D 51/24 239/47 |
| 4,735,016 A | * | 4/1988 | Hougard ................ | A01G 27/04 47/80 |
| 5,042,197 A | * | 8/1991 | Pope ....................... | A01G 9/02 47/71 |
| 5,535,542 A | * | 7/1996 | Gardner ................. | A01G 27/04 47/18 |
| 6,131,334 A | * | 10/2000 | Fan .......................... | A01G 9/04 47/71 |

FOREIGN PATENT DOCUMENTS

WO    WO 2011/047687    *    4/2011

* cited by examiner

*Primary Examiner* — Thanh Pham
(74) *Attorney, Agent, or Firm* — J. Wiley Horton

(57) ABSTRACT

A plant growing, transportation, display, and maintenance system including a plant pot and corresponding container having a selectable valve that controls the flow of liquid into and out of the container.

6 Claims, 23 Drawing Sheets

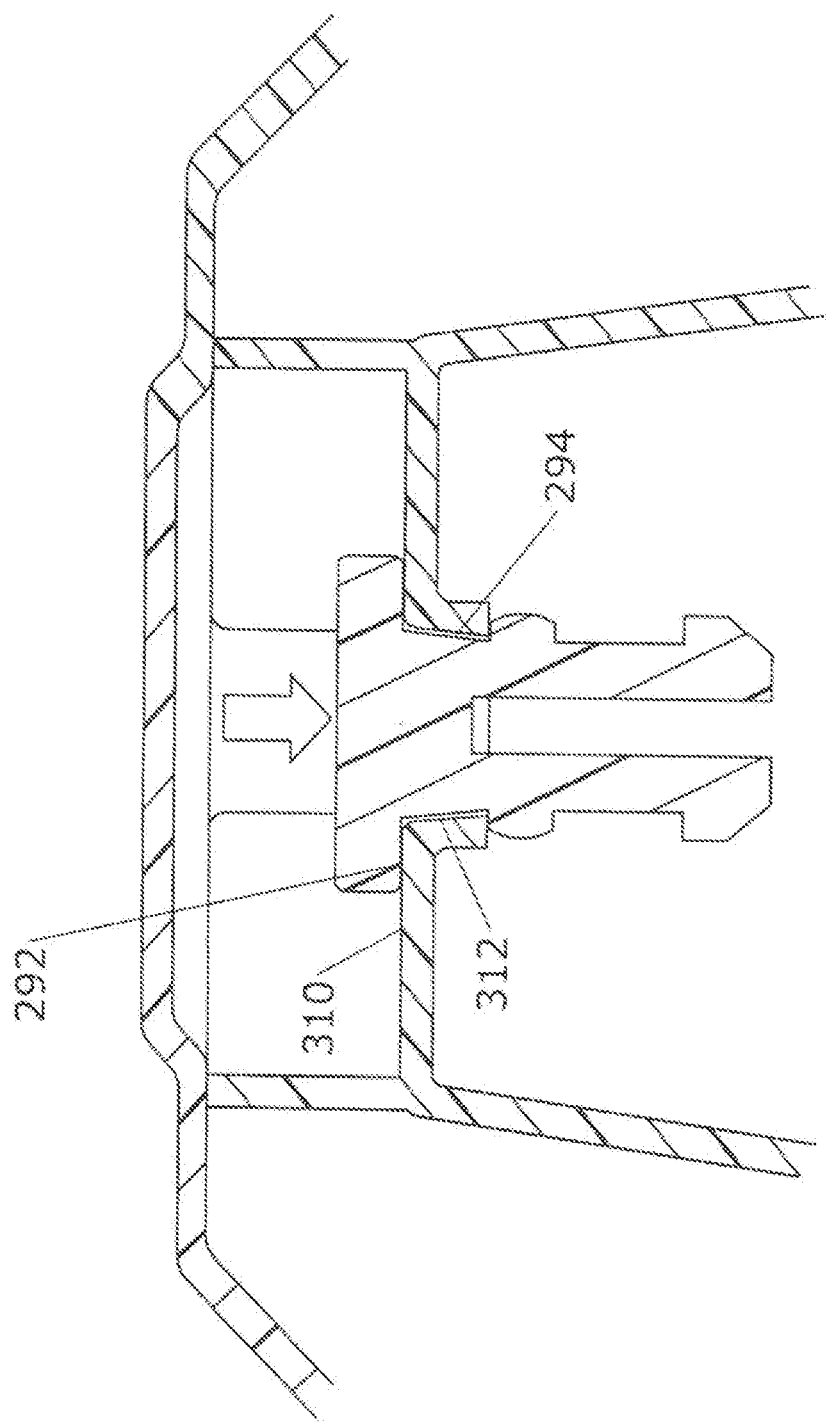

PLANT CONTAINMENT SYSTEM HAVING TWO-POSITION VALVE

CROSS-REFERENCES TO RELATED APPLICATIONS

This application is a continuation of U.S. patent application Ser. No. 13/868,606.

STATEMENT REGARDING FEDERALLY SPONSORED RESEARCH OR DEVELOPMENT

Not applicable.

MICROFICHE APPENDIX

Not applicable.

BACKGROUND OF THE INVENTION

1. Field of the Invention

The present invention relates to the field of agriculture. More specifically, the invention comprises a method for irrigating, storing, transporting, and displaying a plant growing in a pot. The invention includes a variable valve used to control the flow of liquid into and out of an integrated container and plant pot.

2. Description of the Related Art

The invention is useful in the commercial nursery business where many potted plants are grown in bulk. However, the invention could also be used in a wide variety of agricultural applications and it is by no means limited to any particular portion of the field of agriculture.

Growing plants require water. The water may be furnished via rainfall, over spraying, drip irrigation, and other known techniques. Some plant species may be watered continuously without fear of damage. Other species are much more sensitive to the amount of water applied and the application must be regulated precisely.

It is known in the prior art to employ an "ebb and flood" approach to watering (alternatively referred to as an "ebb and flow" approach). In an ebb and flood system, a large amount of water is periodically applied to a group of potted plants (the "flood stage"). It is typical, to drain the water so that it does not remain in contact with the potted plants for very long (the "ebb stage"). Drains may be provided in the pots in order to allow excess water to escape.

One objective of an ebb and flood system is to ensure an adequate water supply to each plant without over-saturating any particular plant. The flow control is efficient in such a system. It is common to provide many plants in a watertight (or mostly watertight) basin. This basin is flooded to a desired level and the water is allowed to stand for an interval in order to soak into the plants residing in the basin. A drain valve is then opened to remove the water.

In this manner, a large amount of water may be efficiently moved into and out of contact with the plants. The water removed may be pumped to another similar basin to create the "flood" cycle there while the "ebb" cycle is occurring in the original basin.

While the ebb and flood approach is effective, it does not work well for some plant species. In particular, some plant species that are sensitive to overwatering may not perform well where an ebb and flood system is used. It is known in the prior art to use a wick-based system to provide water to many different types of plant species. In this approach a wick is inserted into the interior of the pot. One end of the wick extends out of the pot's interior and is connected to a water source.

The wick slowly carries water and possibly dissolved nutrients into the interior of the potted plant. This approach is effective in ensuring an appropriate amount of water without fear of overwatering. However, the use of a wick often requires a complex series of connections between a water source and each individual potted plant. The water distribution is much more complex than is possible with an ebb and flood system. Accordingly, it would be desirable to provide a system that combines the advantages of a wick-based system with the advantages of an ebb and flood distribution system. This is an objective of some of the embodiments of the present invention.

However, as will be seen in the descriptive sections that follow, the present inventive method and system may be used in combination with many known irrigation methods. It is by no means limited to an ebb and flood system.

BRIEF SUMMARY OF THE PRESENT INVENTION

The present invention comprises a plant growing, transportation, display, and maintenance system including a plant pot and corresponding container having a selectable valve that controls the flow of liquid into and out of the container. In the "open" position, the valve allows water to pass into and out of the container in order to provide water to the contents of the plant pot resting in the container. In the "closed" position, the valve prevents any water flow into or out of the container.

The valve allows the assembly of plant pot and container to be "open" during irrigation cycles and "closed" when a fixed supply of water is to be maintained—such as for shipping and use purposes. The supply of water resides near and preferably below the bottom of the plant pot. In the preferred embodiments, one or more wicks extend from the interior of the plant pot down into the water supply. Each wick draws water from the water supply up into the interior of the plant pot.

Each wick is doubled back on itself to form a loop. The loop is placed near the top level of the substrate within the piano pot. An anchor is connected to the loop. The anchor is configured to resist being pulled beneath the top level of the substrate.

In the preferred embodiments, the selectable valve is retained in an overflow opening in the container. In the preferred embodiments, the valve may be easily moved between the "open" and "closed" position using a linear motion such as pushing or pulling.

The assembly of the plant pot and container may preferably be combined with other systems. During the growing phase, the assembly may be combined with an ebb and flood irrigation system. During the display phase, the assembly may be combined with an external water supply such as contained in a trough—with the trough supplying water to the water supply within the container.

BRIEF DESCRIPTION OF THE SEVERAL VIEWS OF THE DRAWINGS

FIG. 36 is a sectional detail view, showing the area of the overflow with a sealing plug in the "closed" position.

Figure 1:
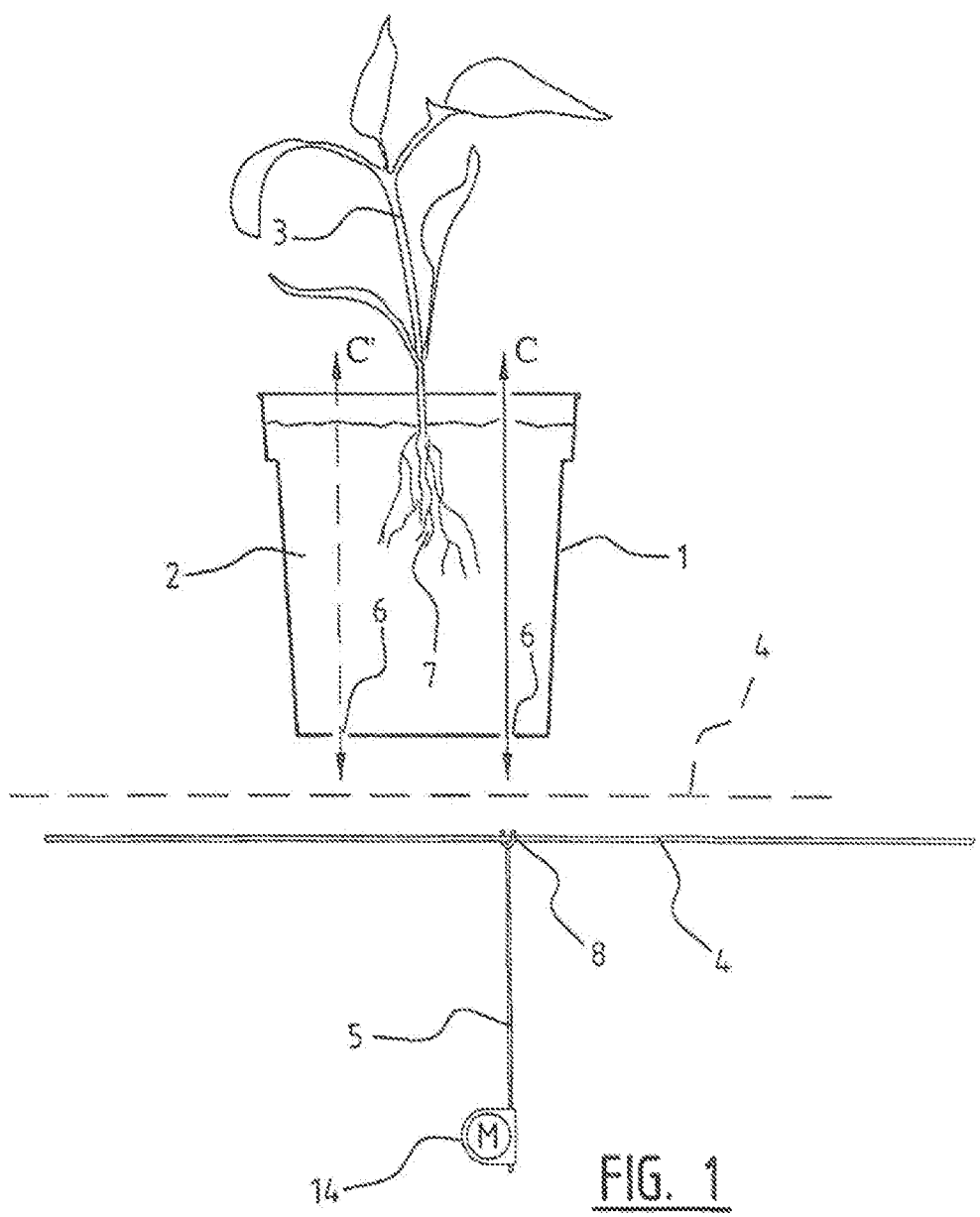
FIG. 1 shows a schematic side view of a plane pot and a wick to be inserted in the plant pot.

REFERENCE NUMERALS IN THE DRAWINGS 1 plant pot
2 soil
3 plant
4 wick
5 lance
6 hole
7 root
8 head
9 loop
10 label
11 string
12 knot
13 hole
14 drive
20 plant pot
21 bottom
22 side wall
23 indentation
24 container
25 water supply
26 channel
27 float
28 label
29 indicators
30 wick
31 needle
32 engaging bead
33 lance
34 hole
35 recess
36 wheel
40 lance
41 plant pot
42 bottom
43 hole
44 running wheel
45 running wheel
46 running wheel
47 side wall
48 camera
49 engaging head
60 plant pot
61 plant
62 label
63 wick
64 container
65 water supply
66 overflow
67 rim
70 tray
71 bottom
72 side wall
73 outflow
74 shift plate
75 water tap
80 tray
81 articulated bottom
82 recess
83 shoulder
84 depression
85 channel
90 tray 91 bottom
92 wall part
93 protrusion
94 separator beam
95 upright profile part
95 crossbar profile part
97 plant pot
98 plant pot
99 pot
100 pallet
101 wheeled base
102 hole
105 collapsible frame
106 tray
107 upright
108 strip
109 hinge
110 banner
111 plant pot
200 insertion system
201 plant pot
202 supply
203 wick material
204 grippers
205 right gripper
206 left gripper
207 right holder
208 left holder
209 knife
210 hole
211 lance
212 hook shaped guide
213 drive
220 transport device
221 frame
222 support
223 plant pot
224 support
225 water
226 flap
227 wick
228 carrier element
230 cover
231 hole
232 grating
235 shoulder
236 protrusion
237 T-shaped profile
240 plant pot
241 soil
242 wick
243 stretching element
250 conventional pot
252 plant
253 overpot
254 water
255 wick
256 container
258 plant pot
260 bottom
262 top flange
264 side wall
268 bole
270 central portion
272 rib
274 side wall
276 bottom
278 central tower
280 support ring
282 gap
284 overflow
286 overflow level
288 plug
290 sealing plate
292 sealing surface
294 tapered plug
295 rib
298 cylinder
300 retaining expansion
302 transverse slot
304 floor
310 horizontal surface
312 tapered side wall

DETAILED DESCRIPTION OF THE INVENTION

FIG. 1 shows a plant pot 1, containing soil 2 or any suitable substrate; like coco, peat, stone wool or glass wool or the like. Also in plant pot 1 a plant 3 is shown to clarify the purpose of the plant pot. However, at the stage depicted in FIG. 1 more usually a plant 3 will not already be growing in the soil 2.

Plant pot 1 comprises a number of bottom holes 6 in the bottom thereof. These are customary and pre-arranged or may be drilled in the plant pot 1 at a time just before the step of inserting the wick is to be executed. For instance customary holes 6 may allow a surplus of water to be discharged from the plant pot 1, and/or roots 7 of a plant 3. The plant may also be provided with air through the toot torn holes or may be allowed to grow through the holes 6 in the bottom of the plant pot. A newly drilled hole may be provided in a plant pot 1 solely for the purpose of arranging a wick 4. Notwithstanding the method of creating the hole 6 (during production of the plant pot 1 or later, just before inserting the wick), measures need to be taken, to allow aligned inserting of the wick 4 through the hole 6.

In FIG. 1 an inserting lance 5 is shown, forming a part of a system for processing plant pots 1, of which in FIG. 1 only the inserting lance 5 is shown in conjunction with a drive 14, The inserting lance 5 has an engaging head 8, which is hook-shaped in order to engage the wick 4. The wick 4 has a predetermined length, and the engaging head 8 is arranged to engage the wick 4 approximately midway. At this time the wick may be tensioned as shown in and described below referring to FIGS. 16-21. Where in the present specification an inserting lance is referred to, this expression is intended to encompass all possible equivalents, such as a needle, a simple stick or rod, or any other elongate element capable of being aligned to a bottom hole and driven there through, and enabling that the wick is engaged and inserted though the pot's bottom hole.

The engaging head 8 is to have sufficiently small dimensions to pass the inserting lance 5 with the engaging head 8 through one of the bottom holes 6 of the plant pot 1, when the drive 14 is selectively operated or activated. In order to be driven through a selected one of the bottom holes 6 in the bottom of the plant pot 1, the inserting lance 5 with the engaging head 8 is connected to the drive 14. The drive 14 enables the inserting lance 5 with the engaging head 8 to be inserted into and withdrawn back out of the plant pot 1 through the bottom hole 6 thereof in the direction of double arrow C. Thereby, the inserting lance 5 is driven upwards, taking the wick 4 along to be extended into the soil 2 in the plant pot 1. Thereafter, the inserting lance 5 is retracted by the drive 14 in a downward direction in the schematic representation of FIG. 1, leaving the wick 4 behind. The inserting speed of the inserting lance 5 may vary and depend for instance on the consistency of the soil or other substrate in the plant pot. Speeds of more than 0.2 inches per second up to 6.0 inches per second (0.5 cm/s up to 15 cm/s) may be effective for inserting the wick 4 using the lance and the drive 14 thereof. For automated applications as envisaged here with the present invention, the inserting speed may vary also and depend on (or at least correspond with) the supply and throughput speed of the plant pots. Preferred inserting speeds may fee approximately 0.8-4.0 inches per second (2-10 cm/s).

The wick 4 can be made from any suitable material that can exhibit a capillary action, such as a fibrous material, a woven or non-woven material, cotton, woven cotton rope, wool, acrylic string, hemp rope, synthetic shoe laces, chamois e.g. 100% rayon, braided polypropylene rope, nylon rope, etc. The wick material may be synthetic and/or natural, and/or designed not to be susceptible to rotting or quite the opposite—be allowed to rot in the course of time.

It is noted here that one or more than one additional wicks may foe inserted into a singular plant pot 1, which is schematically represented with arrow C and second wick 4, which is shown in a dashed line. This may especially be called for in case of larger diameter pots for relatively large plants and/or if bottom holes 6 are small in relation to a desired wick thickness, where a desired water pull up capacity may be achieved using a plurality of wicks, optionally inserted in or through one bottom hole 6 or through a plurality of separate bottom holes 6.

Bottom holes may be dimensioned to have a diameter or effective opening (for instance in case of square holes) of 0.015 square inches to 0.775 square inches (0.1 $cm^2$-5 $cm^2$), more preferably a size between 0.031 square inches to 0.630 square inches (2-4 $cm^2$) and even more preferably a size of approximately 0.047 square inches to 0.465 square inches (0.3-3 $cm^2$). The engaging head 8 must be dimensioned to pass through the bottom holes 6, without damage to the plant pots in the vicinity of the bottom holes 6. Either the holes (when designing the plant pot to correspond with the inserting head) of the head of the inserting lance (when designing the inserting lance, for instance to be used with pots of standard sizes) or both must be made to correspond. Also, the choice of wick material must take the size of the bottom hole into account in particular since—as described below—the wick is doubled up in itself. Thus the wick may have dimensions, that are at most equal to half the free or effective opening of the bottom holes, into or through which it is to be inserted.

The pot may have any suitable and possibly commercially already available size, in non-limiting examples: a height of 4.33 inches (11 cm) and a top rim diameter of 4.72 inches (12 cm); a height of 6.30 inches (16 cm) and a top rim diameter of 6.69 inches (17 cm); or a height of 6.38 inches (16.2 cm) and a top rim diameter of 7.36 inches (18.7 cm), etc. The size of the plant pots in fact does not really matter for the scope of the invention.

Figure 16:
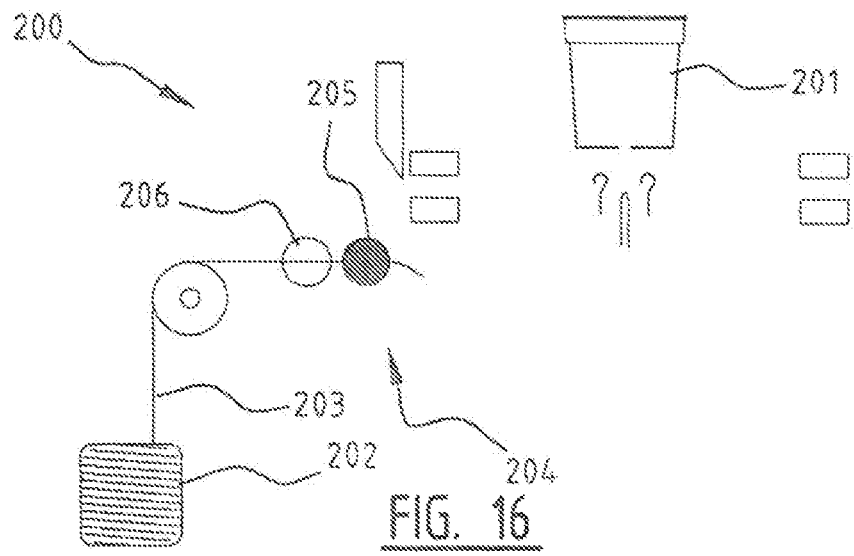
FIGS. 16-21 show a succession of steps and parts of a system for inserting a wick into a plant pot as depicted in FIGS. 1, 2 and 3.
Figure 17:
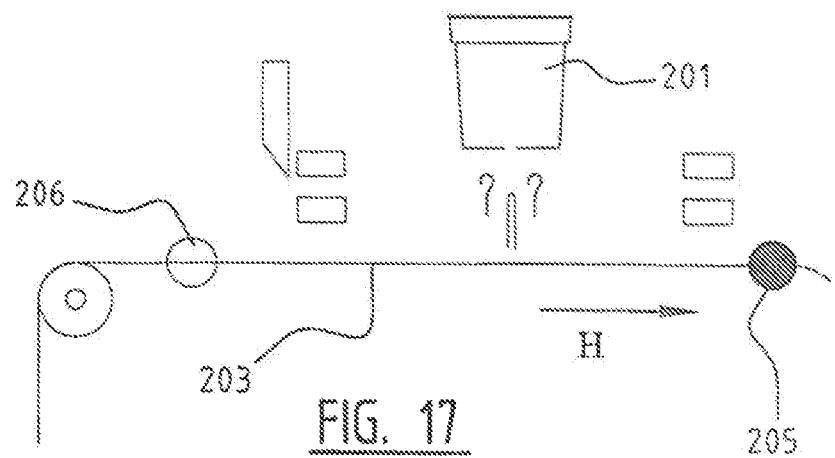
Figure 18:
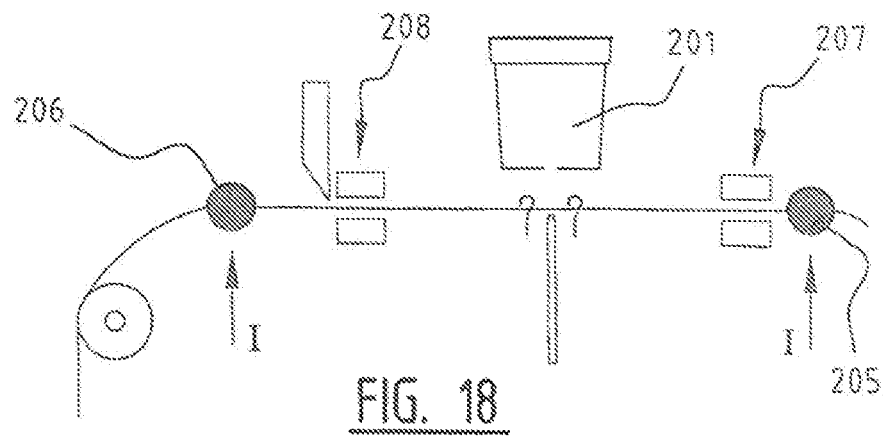
Figure 19:
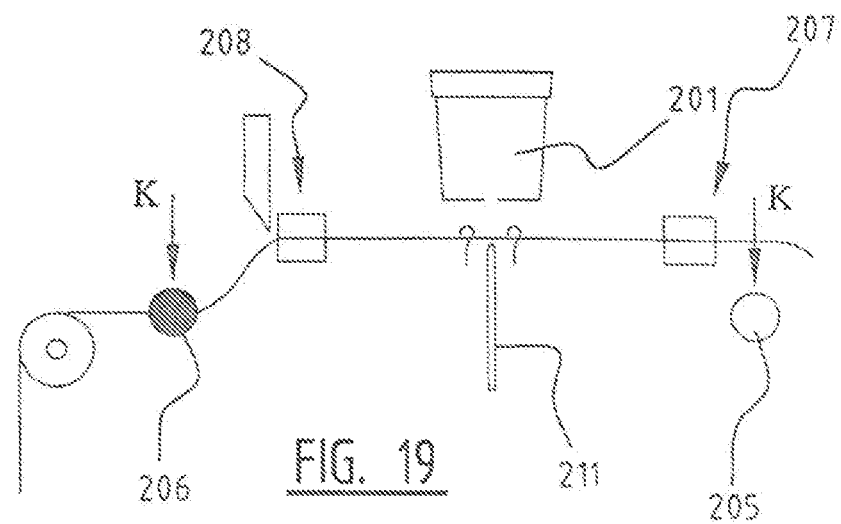

In FIG. 16, a in ore detailed representation is shown of a system 200 for inserting a wick into a plant pot 201. The system comprises a storage and supply 202 containing an uncut length of wire, cable, fabric or other wick material 203, which is fed to a pair of grippers 204. Alternatively, a pre-cut length of wick can be provided for inserting into the pot 201. The right most gripper 205 engages the uncut wick material 203; whereas the left gripper 206 does not engage the uncut wick material, in the representation of FIG. 16. The right gripper 205 then is moved to the right in FIG. 17, in the direction of arrow H, pulling the uncut wick, material 203 through the open left gripper 206.

Figure 20:
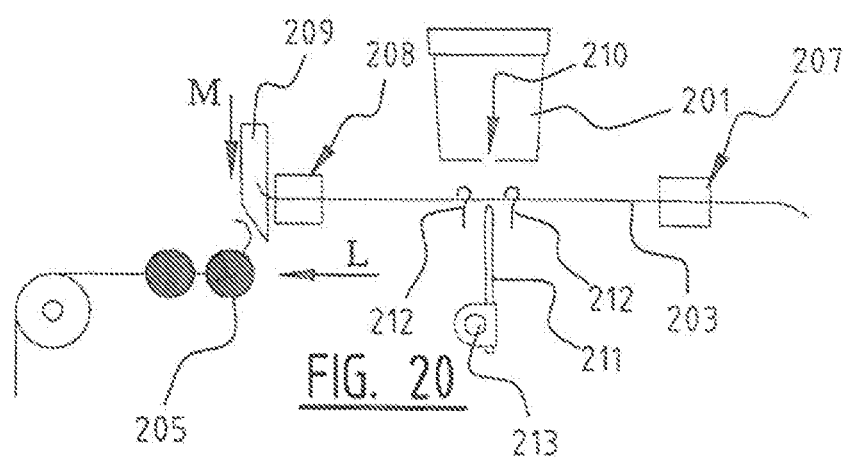

Thereafter, the left gripper 206 is driven to engage the uncut wick material 203; and the combination, of the right gripper 205 and the left gripper 206, both engaging the uncut wick material 203, are moved in the direction of arrows I toward a pair of holders 207, 208, which can, just like the grippers 205, 206, be selectively activated to engage the uncut wick material 203. Moving from FIG. 18 to FIG. 19, the holders 207, 208 have been activated to engage the uncut wick material 203, whereafter the grippers 205, 206 can be moved back in the direction of arrows K, after the right gripper 205 has disengaged the uncut wick material 203. The left gripper 206 keeps engaging the wick material 203. Thereafter, moving from FIG. 19 to FIG. 20, the right gripper 205 is brought back to the vicinity of the left gripper 206 in the direction of arrow L and made to engage the uncut wick material 203. Thereafter, a knife 209 is brought down on the uncut wick material 203, which is tensioned between engaging left holder 208 and the right gripper 205 as a result a desired length of wick, material 203 is made available for inserting thereof through hole 210 in plant pot 201, which predetermined length of wick material 203 is at that point of progress as shown in FIG. 20 still engaged by the right holder 207 and the left holder 208. The wick material may also be severed or cut using alternative means for the knife, such as a laser or heat source, a saw, scissors or a cutting clamp, and the like.

Hook shaped guides 212 are arranged on opposite sides relative to one another and the intermediate inserting lance 211, to guide the wick material 203 during an upward movement of the lance 211 when the drive 213 is activated or operated to move the lance 211 in the direction of arrow C (and back).

Once the determined and pre-cut length of wick material 203 is engaged by the tip of the inserting lance 211, the left holder 208 and the right holder 207 may disengage the cut length of wick material 203. Alternatively, the holders 207, 208 may keep their engagement on the cut length of wick material 203 during the inserting movement in the direction of arrow C of the inserting wick 211, as a consequence of which the holders 207, 208 must be arranged in a movable fashion to move towards and away from the inserting lance 211 in a horizontal direction in the representation of FIG. 21. After the wick has been introduced sufficiently, the holders should disengage the cut length of the wick so as not to pull the wick out of the plant pot.

Figure 21:
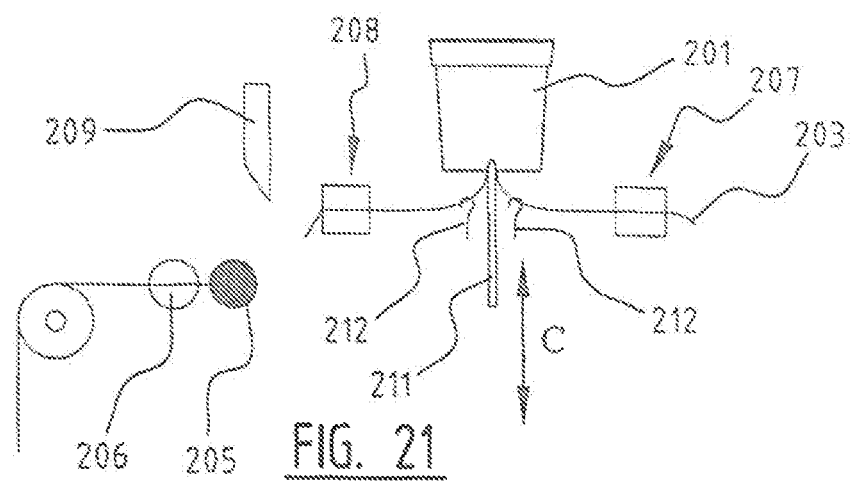

In the meantime, in FIG. 21, the left gripper 206 will have disengaged the uncut wick material 203, so that after withdrawal of the inserting lance 211 from the plant pot 201, the starting configuration of FIG. 16 is reestablished. Thereafter, a new plant pot 201 can be subjected to the operations of a system which schematically functions in accordance with the representation of FIGS. 16-21.

Figure 2:
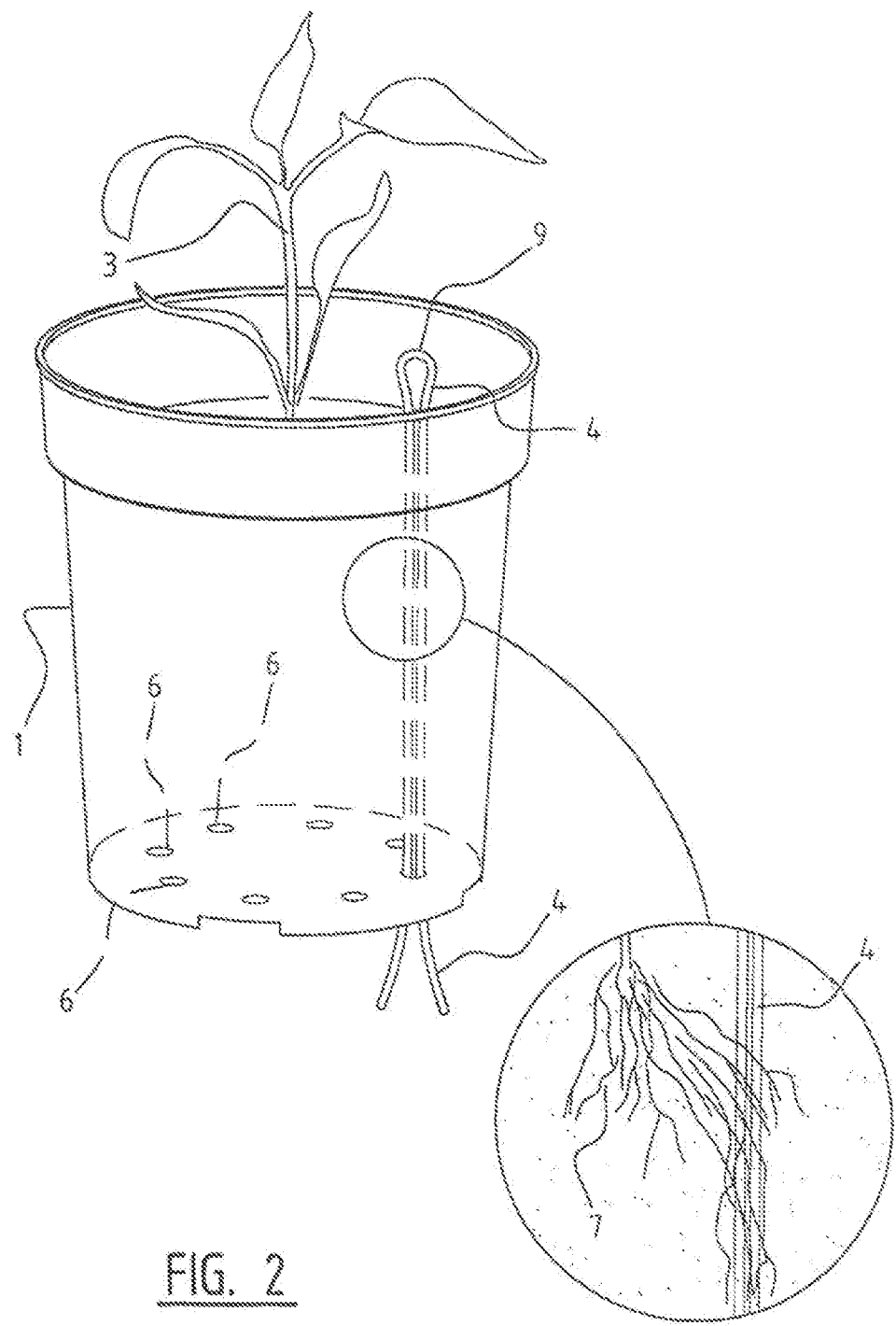
FIG. 2 shows a schematic perspective view of the plant pot of FIG. 1 after insertion of the wick.

In FIG. 2 an intermediate configuration is shown, which results from the actions in FIG. 1 and described herein above.

As a consequence of the feature that the engaging head 8 of the inserting lance 5 engages the wick 4 about midway, after inserting the inserting lance 5 through the bottom hole S all the way up to above the top level of the soil 2 and retracting the inserting wick 5 again, a loop 9 in the wick 4 results. This loop 9 is shown in FIG. 2, and entails that the wick 4 is folded double-back on itself.

Moreover, in the insert detail in FIG. 2, the practical use of a wick 4 in a plant pot 1 is depicted. The wick 4 is designed for and intended to suck up fluid, such as water, into the soil in the plant pot 1. To this end, a supply of water can be provided underneath the plant pot, in a growing situation following arranging of the wick 4. It has been detected that growth of roots 7, as shown in the insert detail in FIG. 2, is drawn towards the wick 4 and the supply of water, provided thereby. Consequently, providing additional wicks (as schematically shown in FIG. 1) may be beneficial to obtain a more homogeneous distribution of roofs 7 through the soil 2 in the plant pot 1. However, as a contrary consideration, provision of water to the insides of the plant pot 1 should not be excessive for any specific species of plant. Some species of plants can be provided with practically unlimited amounts of water, whereas other plants can exhibit deterioration of the roots 7, for instance a rotting process, if an excess of water is furnished.

Figure 3:
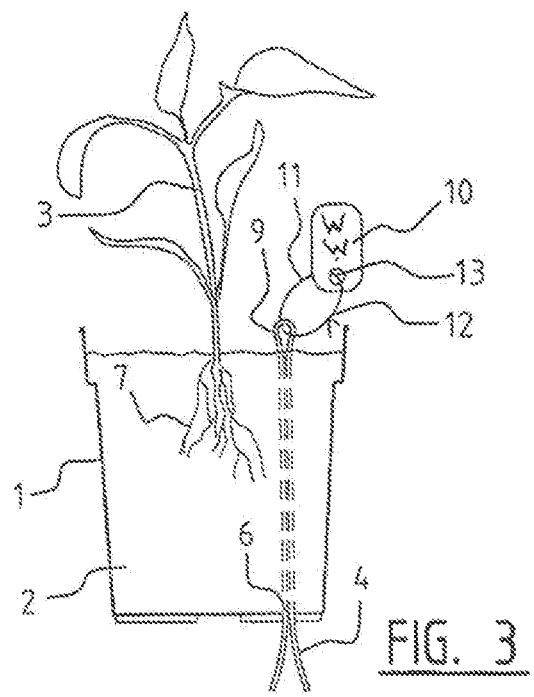
FIG. 3 shows a schematic partially cut away view of the plant pot of FIG. 1 and FIG. 2 with additionally a label.

In FIG. 3 a further feature according to the present invention is shown. The feature relates to a label 10 forming an anchor in the sense of specific embodiments of the present invention, which is arranged on or to the loop 9 in the wick 4. In FIG. 3 the label 10 is connected to the loop 9, using a string 11, which may be tied into a knot 12. The string 11 may be arranged through the loop 9 and a hole 13 in the label 10. Alternatively, an incision can be arranged in the label from an outside edge thereof to extend through the hole 13. In such an alternate embodiment, the loop 9 of the wick 4 can be forced through the incision to arrange the loop 3 in the hole 13 to connect the label 10 to the wick 4.

Figure 4:
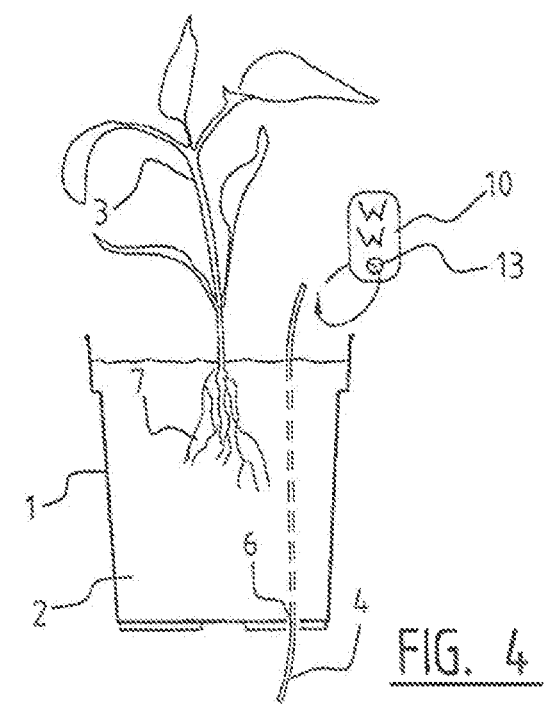
FIG. 4 shows a schematic partially cut away view of an alternative plant pot with an added label.

In FIG. 4 yet another alternate embodiment is shown, wherein a single strand of the wick 4 is inserted, for instance, though not exclusively, through the bottom hole 6 of the plant pot 1 to extend to a height above the top level of the soil 2 in the plant pot 1. The free end of the wick 4 may then, be inserted, through the hole 13 in the label 10 and doubled back upon itself in order to tie a knot or otherwise close a loop.

With a label, attached to a wick 4 in at least one of the above described manners or any alternative configuration, a double function can be achieved. Information about the plant 3 in the plant pot 1 can be furnished to an end user or consumer on the label 10. Simultaneously, since the label at least also extends in a direction across the slender wick, it may be prevented that the wick 4 in a doubled or singular configuration can sink through the soil 2. In this sense the label—or any alternative element—is referred to as an anchor. As a consequence the beneficial effects of such a wick 4, as depicted in the inserted detail in FIG. 2, could be lost. Providing the label 10 to thus form an anchor and arranging the anchor forming label to or on the wick 4 can ensure continued beneficial effect of the wick and simultaneously present an end user or consumer with information about the plant.

Figure 26:
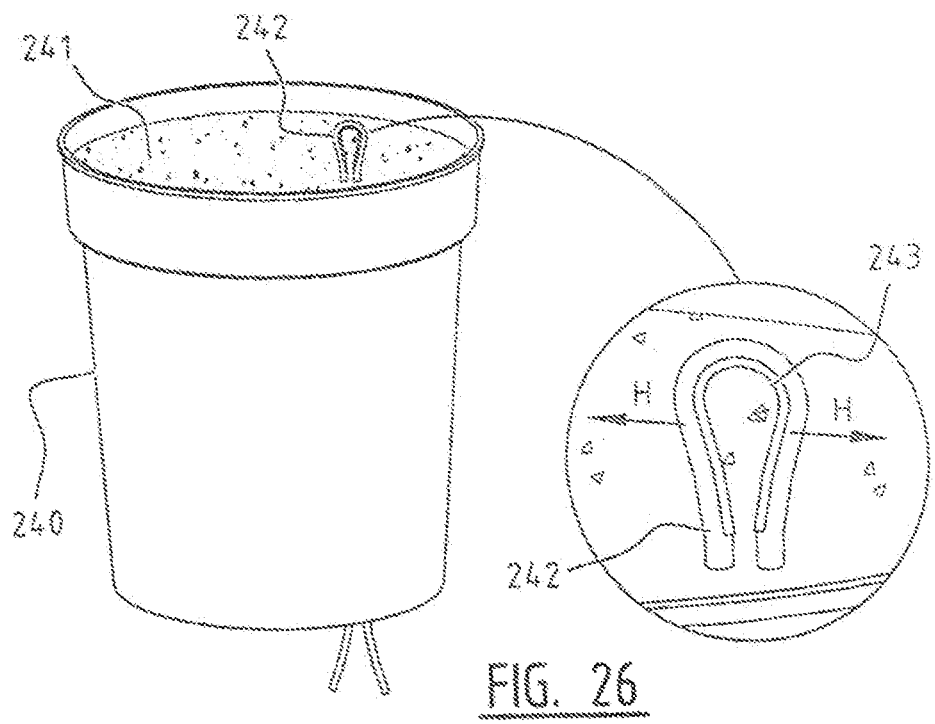

FIG. 26 shows a plant pot 240 with soil 241 or any other suitable substrate and a wick 242 inserted therein, for instance in the above described manner. The wick 242 forms a loop above the top level of the soil 241. To avoid the wick from sinking back down, through the soil 241, an anchor forming stretching element 243 is provided. The stretching element exerts a spreading force in the direction of arrows H on the loop in the wick 242 (across the direction of the wick and the loop therein), to stretch the loop open and thus prevent the wick 242 from sinking down into the soil 241. Any similar and even non-stretching element may be employed in this manner, and may even for instance provide an attachment tor a label. For instance the element 243 may be a locking medallion adapted to prevent the wick from sinking down into the soil 241 and provide a universal base for attaching differing labels thereto. Any element or component that is suitable or intended for keeping the wick 242 from sinking down into the soil 241 or other substrate in the plant pot, can and will be referred to as an anchor in the sense of the present invention.

Figure 5:
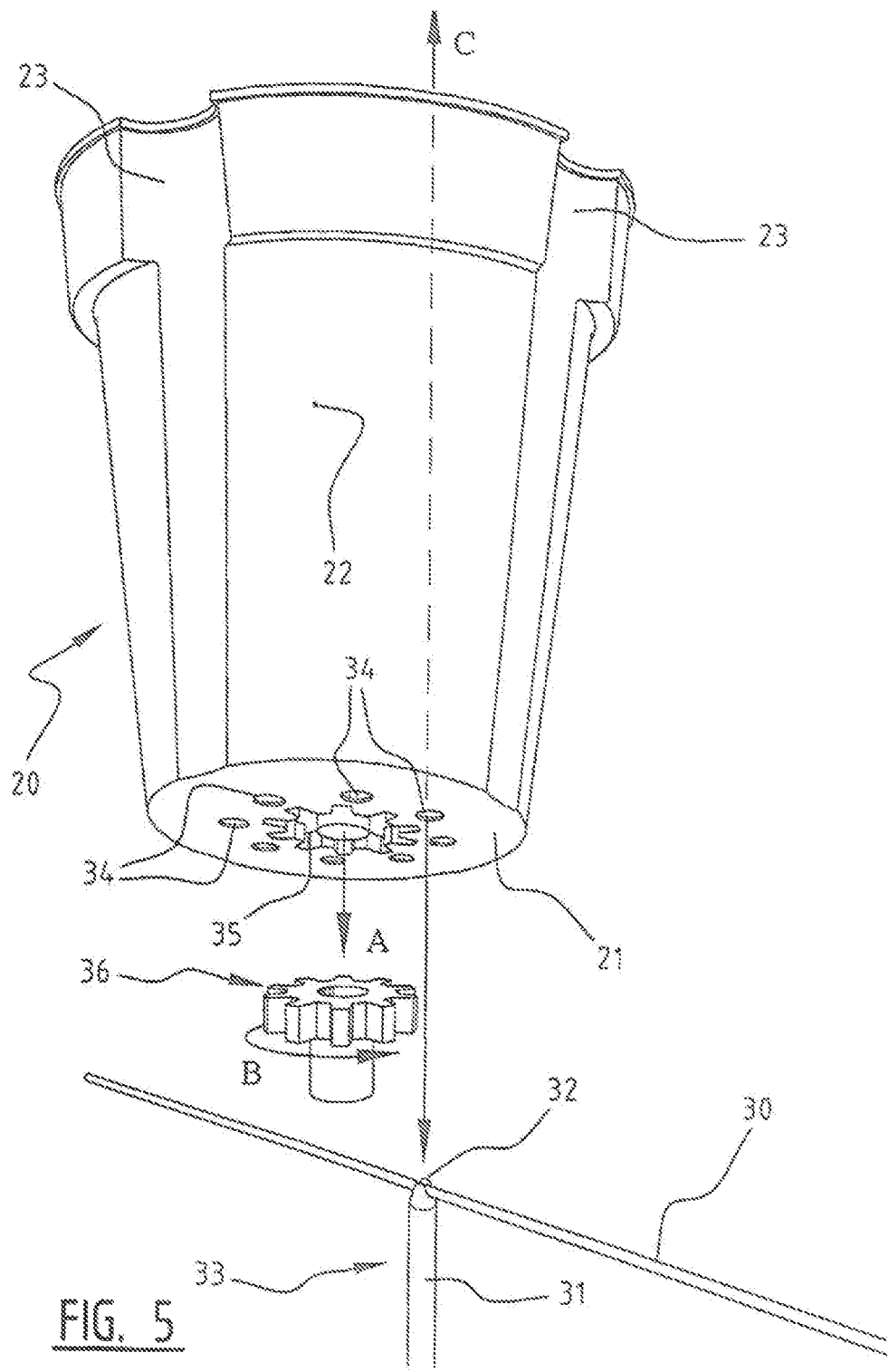
FIG. 5 shows a schematic perspective view of an alternative embodiment of a plant pot and more detailed manner of arranging the wick.

In FIG. 5 a specific plant pot 20 is shown in an embodiment according to the present invention. The plant pot 20 has a bottom 21 and side walls 22. In a top view, such as for instance shown in FIG. 8, the side walls 22 are essentially circular, font exhibit inward oriented indentations 23. Plant pot 20 is designed and intended to be arranged in a container, such as shown in for instance FIGS. 8 and 9. The container 24 can have the appearance, shape and form of essentially a plant pot itself. However, the container would in use normally serve the purpose of providing a water supply, as more specifically depicted in FIG. 9. In the bottom of the container 24 a supply 25 of water is arranged. The water supply 25 in the container 24 can be supplemented via the channels 26 that are defined between the inner wall of the container 24 and the indentations 23 in the side walls 22 of the plant pot 20. Administering additional water for the water supply 25 can be achieved in the direction of arrows G in FIG. 8.

Any one or more than one of the channels 26 can also accommodate a float or straw 27, of which at least a portion extends into the water supply 25, and which exhibits a desired degree of buoyancy. A straw may be closed at bottom end thereof to impart said desired, degree of buoyancy to the straw. A label 28 can be attached to the fee end of the float or straw 27, on which label 28 information about the plant can be printed, for the end user or consumer. Moreover, the height of the float or straw 27 at any given time is an indication of the water level of the water supply 25 in the container 24. Consequently, during growth, production, transport, offer for sale, or at the home of the end user or consumer, a clear indication can foe obtained from the height of the float or straw 27 about the need for supplementing water into the water supply 25 in the container 24.

It is to be noted that specific indicators 29 can be printed or otherwise arranged on the float or straw 27 to furnish a more specific indication of an amount, of water needed to bring the water supply 25 up to a desired level. The indicators 29 can be dependent on the type of plant in the plant pot 20. It is to be noted that also in the configuration according to FIG. 9 a wick 30 is arranged in the plant pot 20, more in particular the wick 30 is arranged in the plant pot 20 before the plant pot 20 is accommodated in the container 24.

In FIG. 5 additional or alternative features for arranging a wick 30 into plant pot 20 are shown, in relation to the description of FIG. 1. Herein, the inserting lance 33 comprises a needle 31 having a U-shaped engaging head 32, which is U-shaped in side view. The wick 30 is to be accommodated in the U-shaped engaging head 32 prior to the needle 31 being driven through any one of the holes 34 in the bottom 21 of the plant pot 20. Again, the inserting lance 33 is driven up through a selected one of the holes 34 in the bottom 21 of the plant pot 20 and retracted after having extended up to at least the top level of the soil 2 in the plant pot 20. Thereafter, the inserting lance 33 is retracted, again following the movements indicated in FIG. 5 with double arrow C.

According to the present invention aligning the inserting lance 33 with a selected one of the holes 34 is achieved in the following manner.

In the embodiment of FIG. 5 one bottom 21 of the plant pot 20 comprises an essentially star-shaped recess 35, which is surrounded by the holes 34, through which the inserting lance 33 may be inserted. The shape of the star-shaped recess 35 corresponds with that of a toothed wheel 36. The toothed wheel 36 is arranged at a stationary height that, is simultaneously arranged for rotation in the direction of arrow B (or an opposite direction). Plant pot 20 can be arranged in the direction of arrow A oil top of toothed wheel 36, whereby the recess 35 may accommodated the toothed wheel 36. Consequently, the toothed Wheel 36 can be driven in the direction of arrow R (or an opposite direction) such that a selected one of the holes 34 will be aligned with the movement in the direction of double arrow C of the inserting lance 33. Due to the correspondence of the shape of the recess 35 and that of the toothed wheel 36, rotation of the toothed wheel 36 will also result in rotation of the plant pot 20 to bring any one of the holes 34 into alignment with the inserting direction of arrow C of the inserting lance 33. Consequently, any one of the holes 34 may be a selected hole, if it can be aligned with the inserting lance 33 in the above described manner first.

The holes 34 in the bottom 21 of the plant pot 20 are arranged in a predetermined configuration relative to the shape and position of the recess 35. Consequently, in this embodiment, a plurality of rotational movements in the direction of arrow B (or in the opposite direction) can be executed to align any one of the holes 34 with the inserting lance 33. Thus the amount of rotation may be minimized to align an arbitrary one of the holes and the inserting lance, where the position of each hole is known beforehand through a predefined relation between the toothed wheel 36 and the recess 35 on the one hand and the positions of the holes 34 on the other hand, in the case of a regular shape of the toothed wheel 36 and recess, for instance, the holes may each be arranged between points of the star shape in FIG. 5 and at a predefined distance from the centre of the bottom of the plant pot (or this may be the case for at least some of the holes). If this relationship is known, the position of each hole and alignment of any hole with the lance will be known to have been achieved at a reached rotational position of the wheel 36 and therewith the plant pot 20.

The shape of the recess 35 and that of the toothed wheel 36 can be arbitrarily chosen by the skilled person. Of importance in such a choice of shape is the ability to drive the plant pot 20 in a rotational movement in accordance with arrow B in FIG. 5, and simultaneously define positions of the holes 34 in the bottom 21 of the plant pot 20 in order to achieve alignment of any one of these holes 34 with the inserting lance. For instance, the shape of the recess 35 and that of the wheel 36 could be oval, triangular, a pentagram, etc.

It is to be noted that the present embodiment according to FIG. 5 requires some adaptation to the bottom 21 of the plant pot 20. Some plant pots may have central, recesses in the bottom thereof, and a specialized wheel can be configured to engage these central recesses. Upright, walls of such recesses may also have slits, which can be engaged by a specific embodiment of a wheel that can be comparable with the toothed wheel 36 to engage the plant pot in the slits of the central recess rather than to provide a special star-shaped or other particular recess like the one 35 in FIG. 5.

Figure 6:
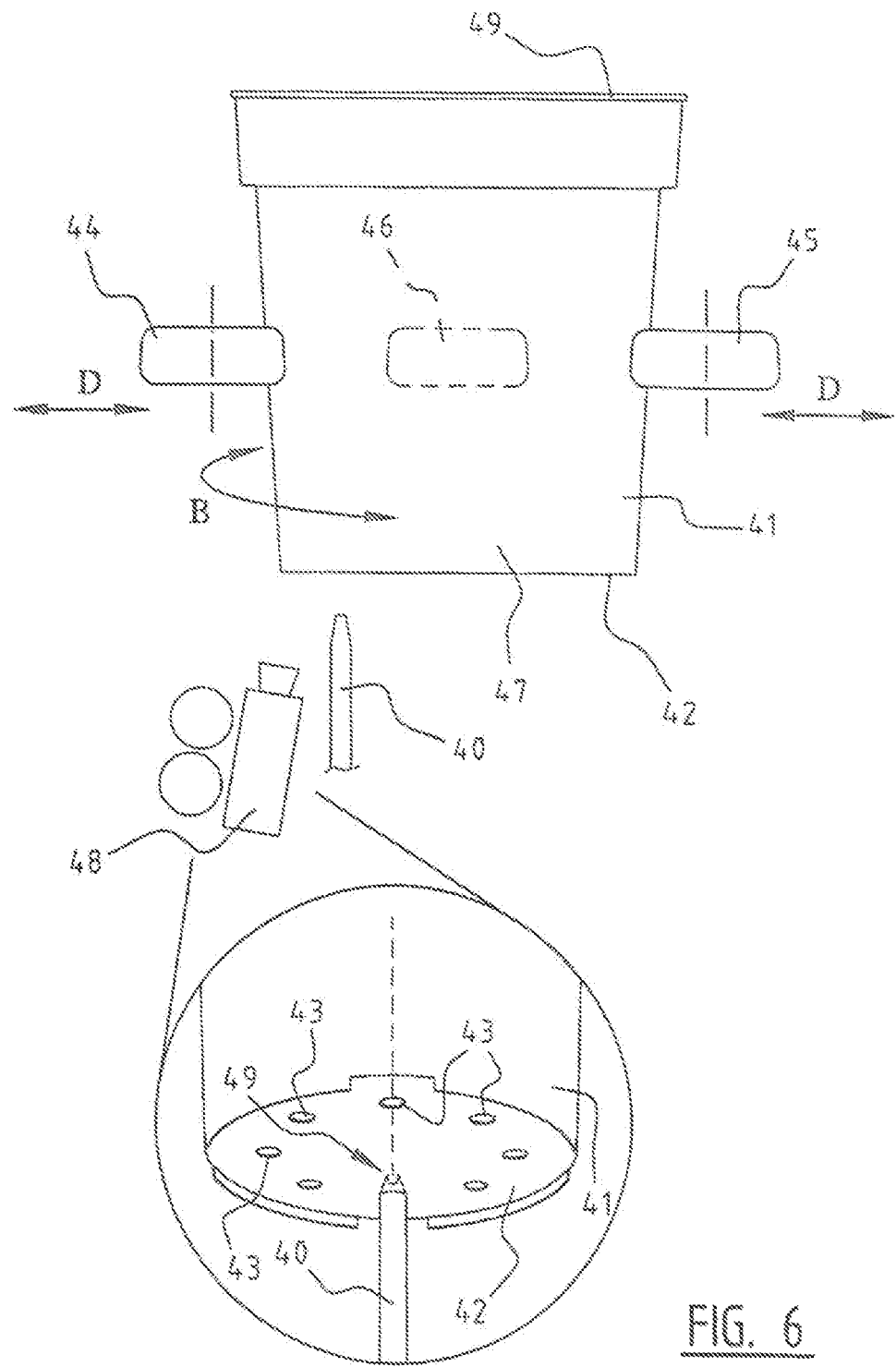
FIG. 6 shows a schematic view of an alternative embodiment relative to FIG. 5 with respect to aligning and arranging a wick in the plant pot.

As yet another alternative embodiment, as shown in FIG. 6, an inserting lance 40 can be aligned to holes 43 in a bottom 42 of a plant pot 41, even without a central recess. In the embodiment that is shown in FIG. 6, running wheels 44, 45 and 46 are distributed around the circumference of the side wall 47 of the plant pot 41. After a plant pot 41 is provided, the running wheels 44, 45 and 46 can be made to abut against the outer service of the side walls 47 of the plant pot 41 by displacement of the running wheels 44, 45 and 46 in the direction of arrows D, By subsequently driving the running wheels 44, 45 and 46, which are evenly distributed around the circumference of the plant pot 41 in a rotational movement of each singular running wheel 44, 45 and 46, a rotation of the plant pot 41 in the direction of arrow B (or the opposite direction) can be achieved. At such a rotational movement in the direction of arrow B of the piano pot 41, a camera 48 or any suitable imaging or vision means can be oriented at the bottom 42 of the plant pot 41, the two determine at which rotational position of the plant pot 41 the inserting lance 40 is aligned with any one and more in particular a selected one of the holes 43 in the bottom 42 of the plant pot 41. When such alignment is detected, the running wheels 44, 45 and 46 are arrested or halted to allow the inserting lance 40 to be inserted into and through, the aligned one of the holes 43. With a wick (not shown in FIG. 6) accommodated in the U-shaped engaging head 49, the (not shown) wick can be arranged through the aligned one of the holes 43 and into the soil in the plant pot 41 to achieve a result, much the same as the one shown in FIG. 3. However, in this embodiment, no adaptation of the bottom 42 of the plant pot 41 is required.

It is to be noted here, that also other rotational, drives can be employed that do not necessarily engage the outer surface of the side walls 47 of the plant pot 41, but may for instance engage the top rim 43 of the plant pot 41, or yet another alternative, wherein any one of the holes 43 may be engaged to drive the plant pot 41 in a rotational movement, to align another one of the holes 43 in the bottom 42 of the plant pot 41.

Figure 7:
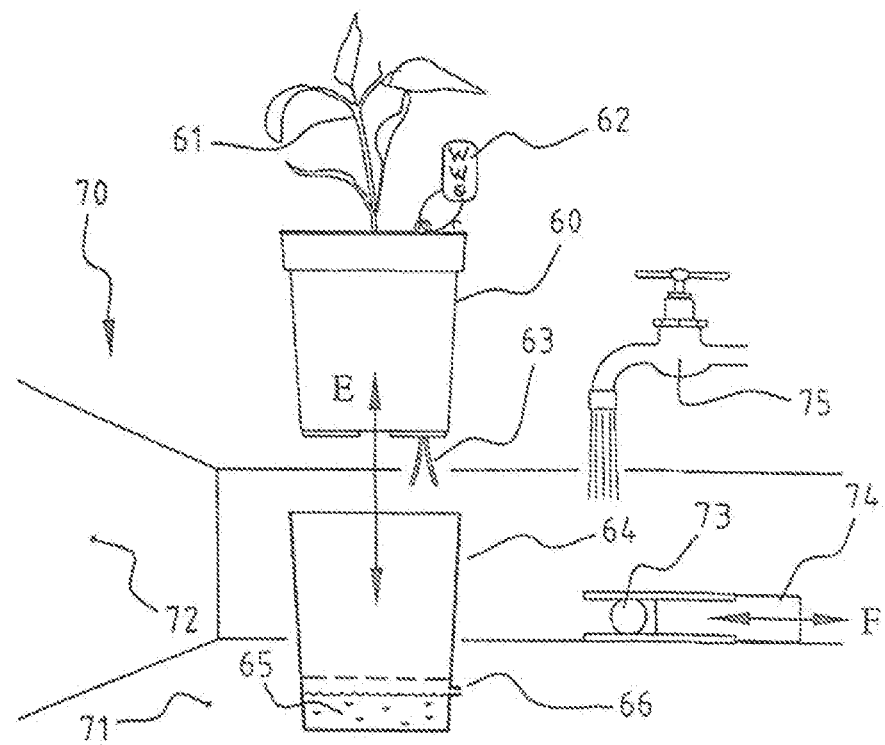
FIG. 7 shows a schematic view of a plant pot and container assembly in use in an ebb and flood based tray.

In FIG. 7 an embodiment of use of a plant pot 60 is depicted in a configuration, also according to the present application for growing the plants 61 in a controlled manner. Plant pot 60 is provided with a wick 63, to which a label 62 is arranged above the top surface of the soil in the plant pot 60. The plant 61 grows in that soil. The plant pot 60 can be accommodated in a container 64, containing a water supply 65. The wick 63 may serve to draw up water from the supply 65 into the soil in the plant pot 60, after the plant pot 60 is accommodated in the container 64 in the direction of double arrow E, after which a rim 67 of the plant pot 60 rests on the top circumferential edge of the container 64 to keep the bottom of the plant pot 60 above the normal level (depicted in FIG. 7) of the water supply 65. The plant pot 60 may also be extracted from the container 64, for which reason the arrow E is double.

The container 64 comprises an overflow 66, defining a free passage for entry and/or outflow of water into and out of the container 64. The overflow 66 is arranged at a height in the side wall of the container 64 below the bottom of a plant pot 60 accommodated in the container 64. Thus the bottom of the plant pot 60 is above the level of the water supply 65 inside the container 64. Thus the remaining height of the container 64 above the overflow 66 corresponds with the height of the plant pot 60, in that the remaining height of the container 64 exceeds the height of the plant pot 60. Further the overflow is at such a height, that the water supply 65 in the container 64 suffices for an intended purpose, such as to sustain growth of a plant in the plant pot 60 via the wick 63 for a predetermined period of time during development of the plant or for instance to prevent the plant from withering during transport or display for sale. The overflow 66 may be closed using a plug or the like, for instance during transport, to ensure the availability of the water supply 65 for the plant. The assembly of the container 64 and the plant pot 60 would then be transported together in an assembled state thereof.

The container 64 is, in the embodiment of FIG. 7, arranged in a tray 70 comprising a bottom 71 and side walls 72. In one of these side walls 72 an outflow 73 is provided, which in a simple embodiment can entail no more than a simple hole. The outflow 73 can be closed, using a shift plate 74 or any suitable means. The shift plate 74 is movable in the direction of double arrow F to either close the outflow 73 or allow free passage of water from the tray 70. Further, the tray 70 is combined with a water tap 75 to add water into the tray 70. Using the water tap 75, the water level in the tray 70 can be increased to above the overflow 66, and consequently also within the container 64 via the overflow 66. The soil in the plant pot 60 can thereby be fully saturated. Thereafter, the water tap 75 can be closed and the shift plate 74, forming a type of valve, can be opened to free the outflow 73 and lower the level of water in the tray 70. At such a time, also the water level within the container 64 will lower, after which water supply to the soil in the plant pot 60 will be achieved mainly using the wick 63. This increasing and lowering of a water level within the tray 70 is schematically represented, that is generally referred to as an ebb and flood system, which has proven useful and reliable for regulating humidity of the soil in plant pots, although this has not previously been achieved using a combination thereof with a wick 63 and/or with a container like the container 54 in FIG. 7.

Figure 8:
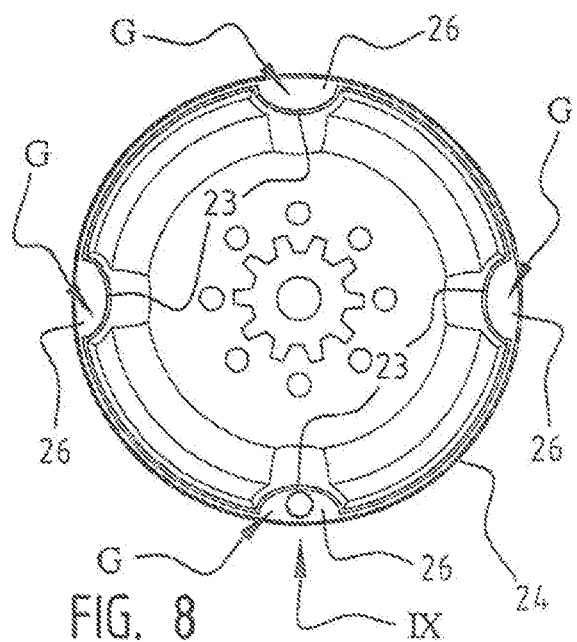
FIG. 8 shows a schematic top view of the plant pot and container assembly of FIG. 7.
Figure 27:
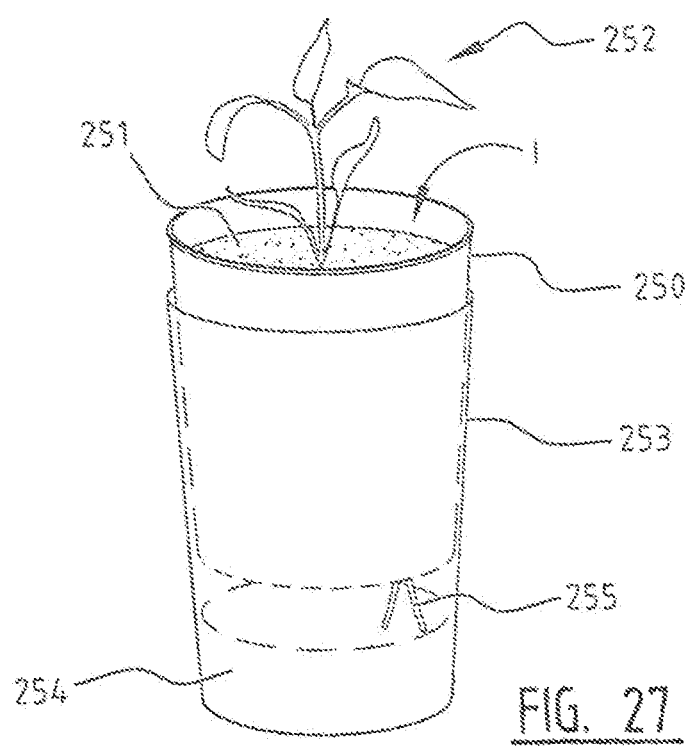
FIG. 27 shows an alternative relative to FIG. 8.

FIG. 27 shows an alternative with a conventional pot 250 without the indentations 23 of the pot in FIG. 8 but with a wick 255 and an overpot 253 without an overflow instead of the container 24 of FIG. 8. In this alternative of FIG. 27, the pot 250 contains soil 251 for a plant 252, to which water may be supplied in the direction of arrow I. Since there are no indentations 23, no channels are available to supply water to lower parts of the overpot 253. Water then trickles down through the pot 250 and is caught in overpot 253 to form a reservoir at the bottom thereof. At the bottom of the pot 250, a wick 255 extends into water 254 in the bottom of overpot 253, to suck or draw up water for the plant 252. The plant 252 may be transported in the plant pot 250 and in the overpot 253, but intended and envisaged use is for the plant in the pot 250 to be taken out of the overpot 253 for transport, as a consequence of which, the overpot stays at the grower.

Figure 9:
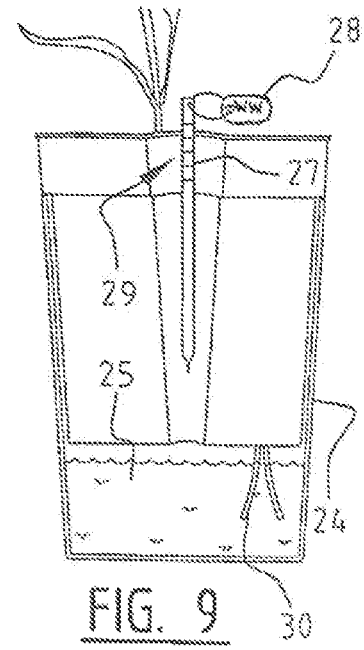
FIG. 9 shows a schematic, partially broken away side view of the plant pot and container assembly of FIG. 7 and FIG. 8 with additionally a water level indicator.
Figure 10:
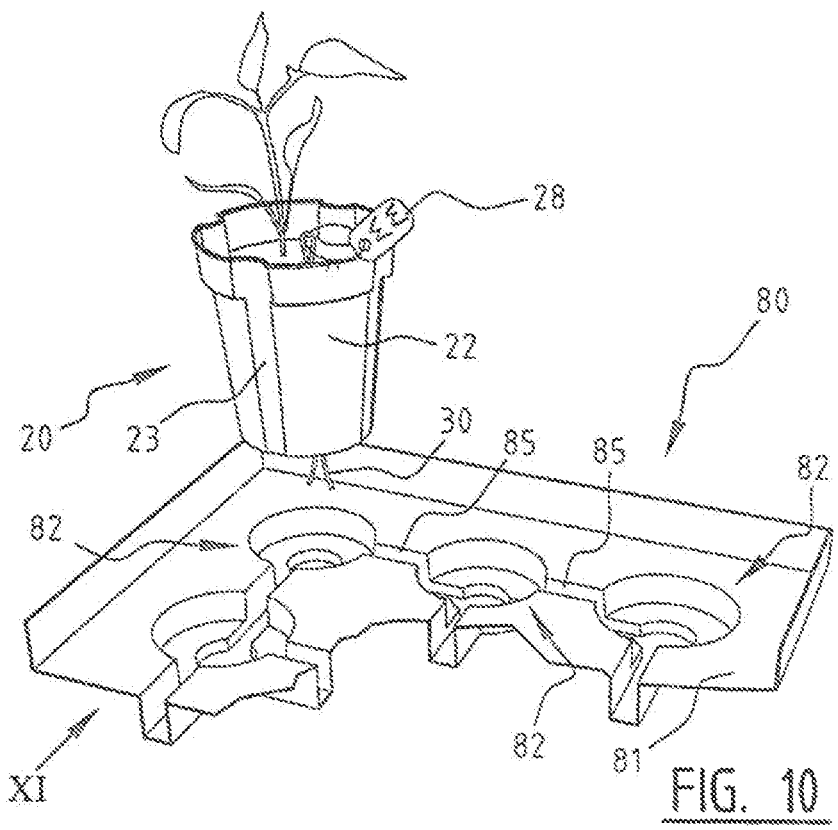
FIG. 10 shows a schematic perspective view of a plant pot much like the one in FIGS. 5, 8 and 9 in an accommodating tray suitable for growing, transporting and displaying for sale of plants.
Figure 11:
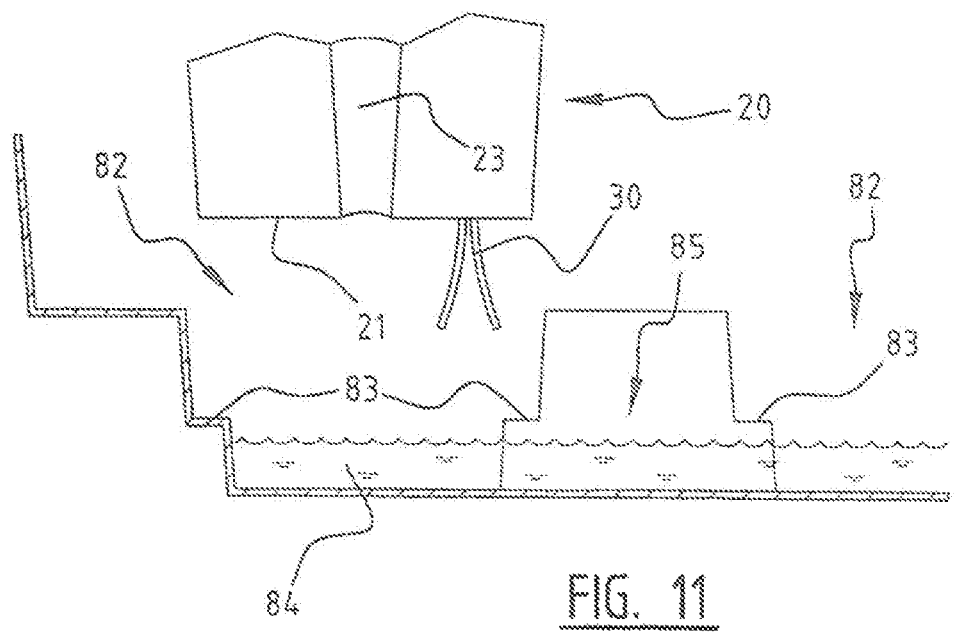
FIG. 11 shows a schematic side view along arrow XI in FIG. 10.

In FIG. 10 and FIG. 11 a tray 80 is shown in combination with a plant pot 20, which for the sake of the exemplarily embodiment here is the same plant pot as the one depicted in FIGS. 5, 8 and 9. Tray 80 has an articulated bottom, having recesses 82, which has a shape and form to accommodate the bottom 21 of a plant pot 20 in a preferably close fitting manner. In the context of this disclosure, the term "articulated" means having sections that are joined together into a unified whole. It does not imply that the joints involved are flexible and does not imply that the joints allow significant movement between the sections.

Each recess 82, as shown in FIG. 11, comprises a shoulder 83, which acts as a support for the plant pot 20, when the bottom 21 of the plant pot 20 is inserted into an intended one of the recesses 82.

The shoulder 83 surrounds a further depression 84, which acts as a reservoir for water when the plant pot 20 is accommodated in the recess 82, where the wick 30 will, extend into this further depression 84 to draw up water from the reservoir formed by the further depression 84.

Between neighbouring recesses 82 and further depressions 84 in the articulated bottom 81 of the tray 80 channels 85 are defined. The channels 85 allow for distribution of water over the recesses 82 and further depressions 84, to which end the channels have a depth corresponding with the lowermost portions of the further depressions 84, so that water is distributed over the further depressions 84, even when plant pots 20 are accommodated in the recesses 82. It is to be noted that the indentations 23 in the side walls 22 of the plant pot 20 in a proper orientation of the plant pot 20 in the recess 82 of the tray 80 allow water to be supplemented into the reservoir formed by the further depression 84.

Consequently, water can be administered to the plants directly, using specifically watering means or by simply spraying or sprinkling water into the tray 8. For such wide spread watering, a watering boom, (not shown) can be employed, whereby a considerable simplification for watering plants can be achieved in this embodiment.

The tray 80 of FIG. 10 or FIG. 11 can be used for growing plants or maybe even for transporting plants in the plant pots 20. Such trays 80 may even be used for display purposes.

Figure 12:
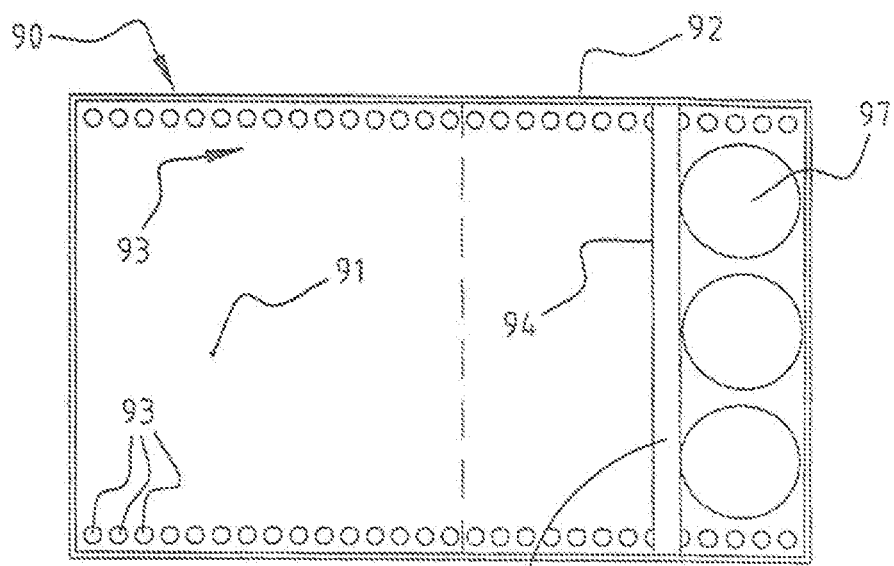
FIG. 12 and FIG. 13 show schematic top views of plant pots in an alternative accommodating tray suitable for growing, transporting and displaying for sale of plants.
Figure 13:
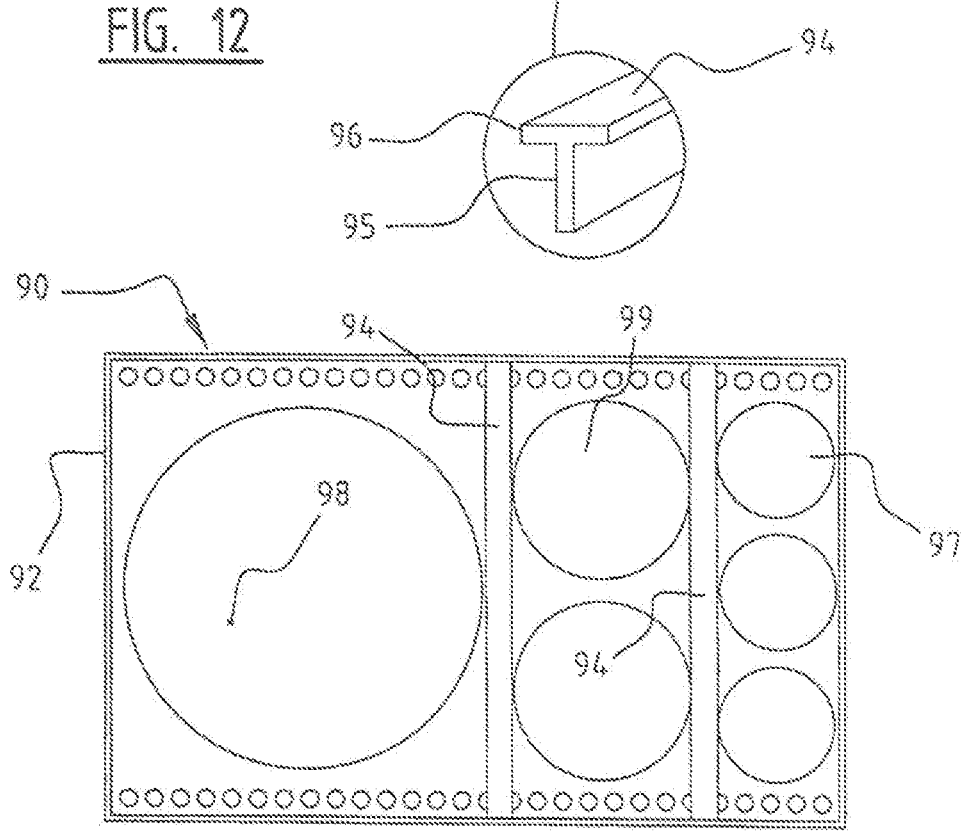

Likewise, FIG. 12 and FIG. 13 show a further example of a tray 90 having a bottom 91 and upright wall parts 92, surrounding the bottom 91. The bottom 91 of the tray 90 is provided with protrusions 93 in two rows along the longer sides of the tray 90. The protrusions define an intermediate space, into which a separator beam 94 can be inserted. The separator beam 94 is an T-profile, as shown in the insert detail of FIG. 12. The upright profile part 95 of the T-shaped separator beam 94 can be inserted into the space defined between two neighbouring protrusions 93, while simultaneously the crossbar profile part 96 of the separator beam 94 defines an intermediate space between neighbouring plant pots on opposite sides of the separator beam 94. As shown in FIG. 13, a relatively large plant pot 98 can stably be arranged between a side wall 92 of the tray and a separator beam 94, inserted therein, whilst smaller pots 99 can be safely and stably arranged between neighbouring separator beams 94. Even relatively small plant pots 97 can be transported in a stable manner and even displayed at a point of sale, accommodated between a side wall 92 of the tray 90 and an inserted separator beam 94.

Figure 14:
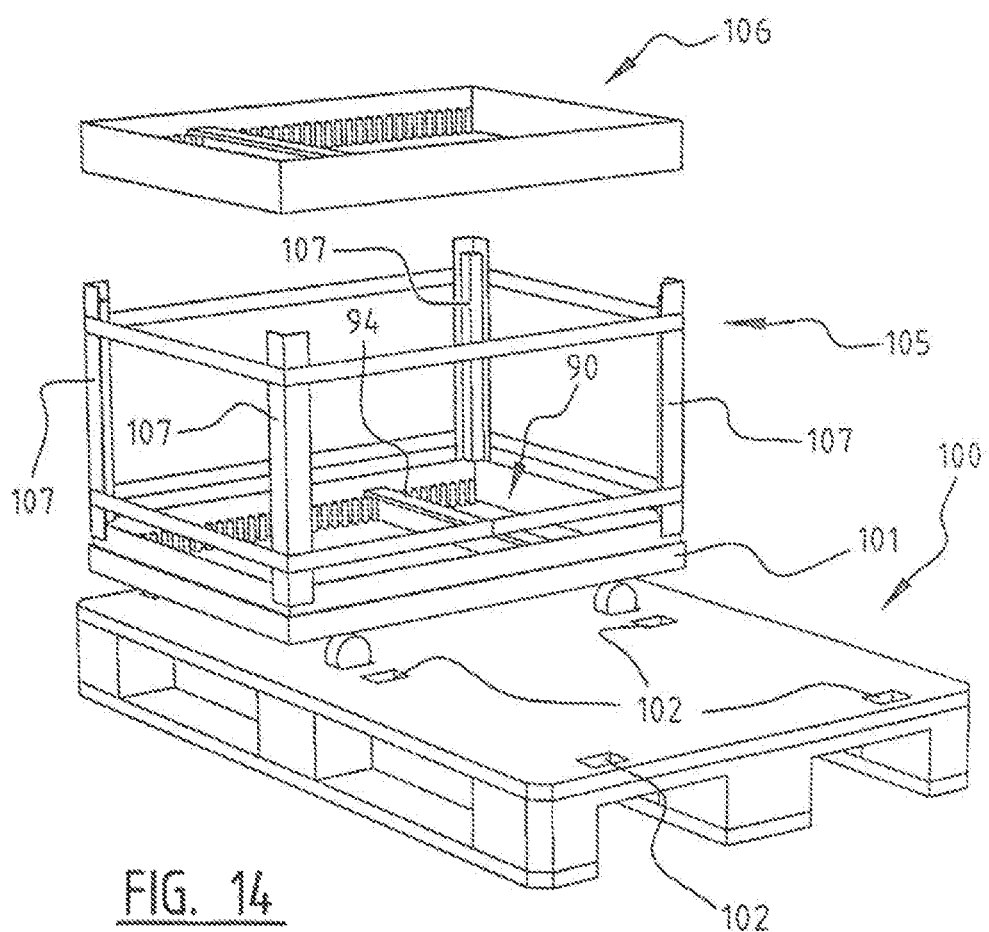
FIG. 14 shows a perspective schematic view of a stack of trays with a collapsible structure between subsequent trays in the stack, wherein the trays are suitable for at least growing plants in pots and the stack is suitable for growing, transporting and displaying for sale of plants.
Figure 15:
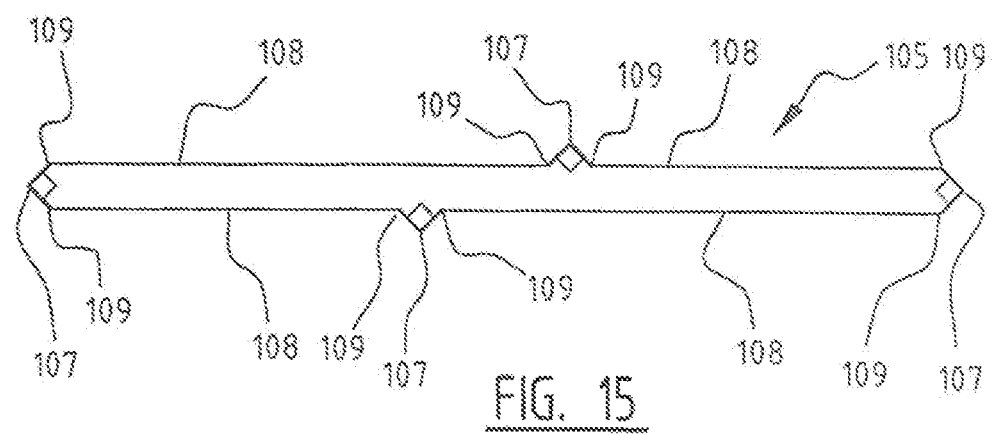
FIG. 15 shows a schematic side view of a collapsible structure in a collapsed state.

In order to emphasize the usability of separable types of trays in combination with plant pots for growing plants, transporting the plant pots and offering the plants for sale in the form, of a display, FIGS. 14 and 15 show that a wheeled base 101 can be arranged on top of a pallet 100, more in particular with the wheels of the wheeled based 101 sunk into holes 102 in the top of the pallet 100. The holes 102 can be arranged cross the top surface of the pallet 100, but slight depressions may also serve the purpose of immobilizing the wheeled base 101 on top of the pallet 100.

The wheeled base 101 forms a support for a tray, for instance the tray of FIGS. 12 and 13. Such a tray 90 may be embodied from sturdy plastic, which is sufficiently strong to carry a collapsible frame 105 on the corners thereof. The collapsible frame 105 is shown in FIG. 15 in a collapsed state. The collapsible frame 105 comprises four uprights 107, which correspond in position and orientation with the corners of the tray 90, to be arranged thereon. The uprights 107 are mutually connected by bands or strips 103, To achieve the collapsed situation of FIG. 15 in an embodiment where strips 108 are employed to connect uprights 107, hinges 109 should be arranged between the uprights 107 and the strips 108. As an alternative for the hinges 109, connecting elements of flexible material can also be employed or any other suitable alternative.

With the collapsible frame in an expanded configuration as shown in FIG. 14, the collapsible frame 105 forms a support for a further or additional tray 106 which can essentially be a tray as the one on the wheeled base 101 or at least of the same type.

The length of the uprights of the collapsible frame 105 may be selected in accordance with the expected height of plants to be transported in plant pots to be arranged on the bottom of the trays 90, 106. A further collapsible frame 105 can be added on top of the further tray 106, to continue stacking trays and increasing the height of the thus created assembly.

It is to be noted that plants can be grown in pots, arranged in trays 106, to be stacked using collapsible frames 105 (or similar devices) for transport. After reaching a destination or point of sale, an assembly comprising a wheeled base 101 and the stack of trays 90, 106 and intermediate collapsible frames 105 can be taken off the pallet 100 to be driven to a display position. Consequently, end users or consumers can take plants in plant pots out of the trays 90, 106 to the checkout counter for payment thereof. Such a display using grow trays 90, 106 can then be returned to a grower to be re-used. For this purpose, the frames 105 are preferably collapsible or can at least, to some degree, be disassembled to save transport space during a return journey.

Figure 28:
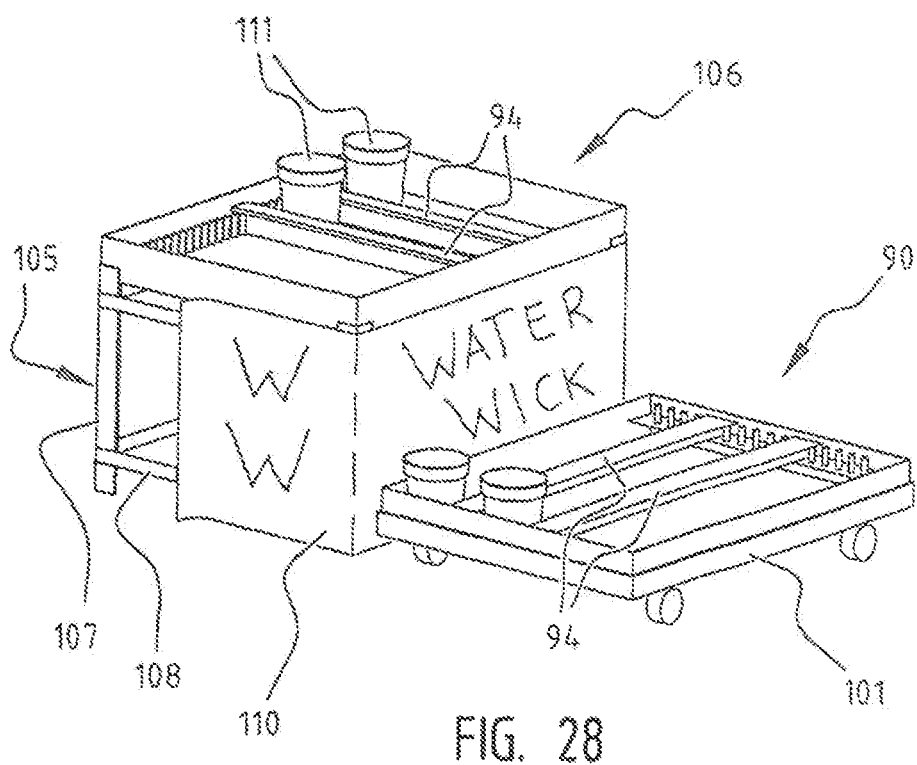
FIG. 28 shows an arrangement for display for sale of plants in plant pots that can be formed from the assembly of FIGS. 14 and 15.

In FIG. 28, the assembly of FIG. 14 is used to display plants on offer for sale. Plant pots 111 are arranged in trays 90, 106, and held upright in a sturdy manner, for instance using the separator beams in FIG. 14. The collapsible frame 105 with the higher tray 106 thereon has been taken off the lower tray 103, and been, set down on the ground besides the wheeled base 101 carrying she lower tray 90. A banner 110 is then optionally wrapped around and arranged on the collapsible frame 105 (for instance using VELCRO connections or the like) to enhance the attractive appeal of the thus formed configuration. The banner 110 may be printed with plant information, grower information, a picture of the plants on offer for sale, a solid color or the like. Although no plants are shown in FIG. 28, the plant pots 111 will contain plants in practice.

Figure 22:
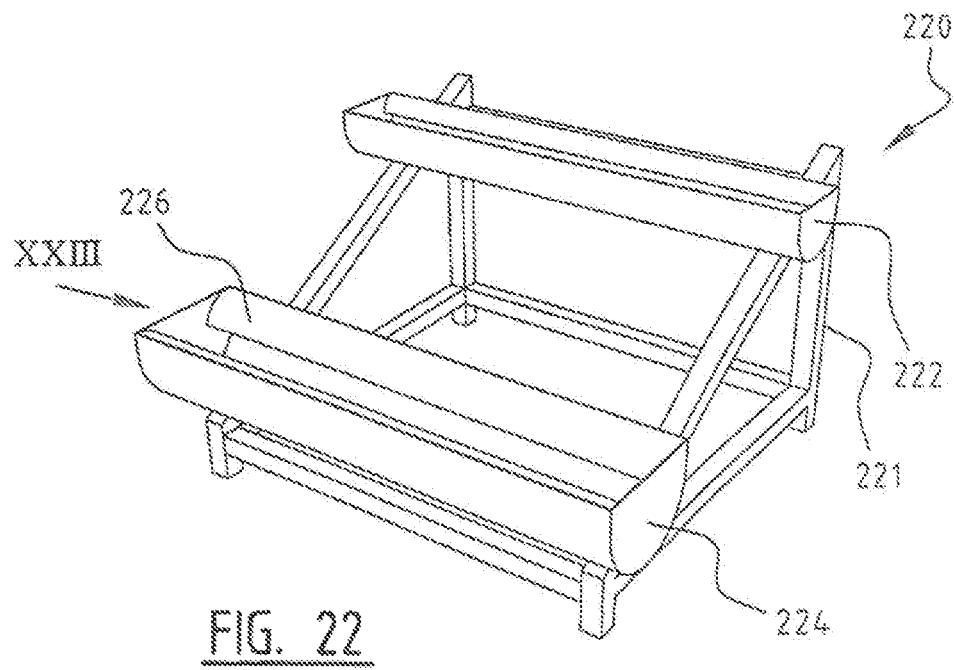
FIG. 22 shows a schematic perspective view of a system adapted to accommodate plant, pots with a wick, for instance for display plants for sale.
Figure 23:
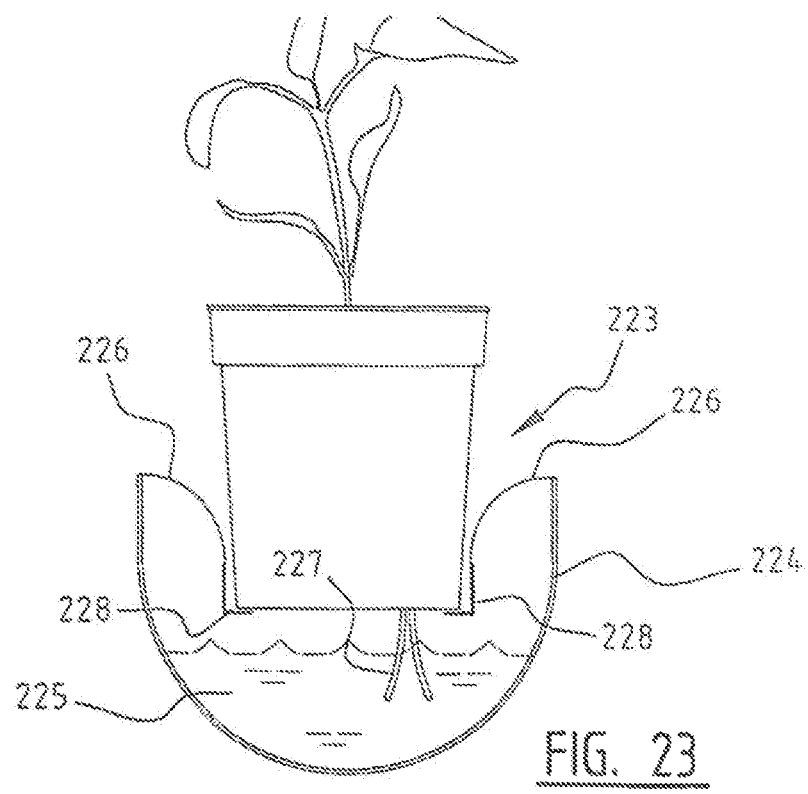
FIG. 23 shows a cross sectional schematic side view along arrow XXIII in FIG. 22.
Figure 24:
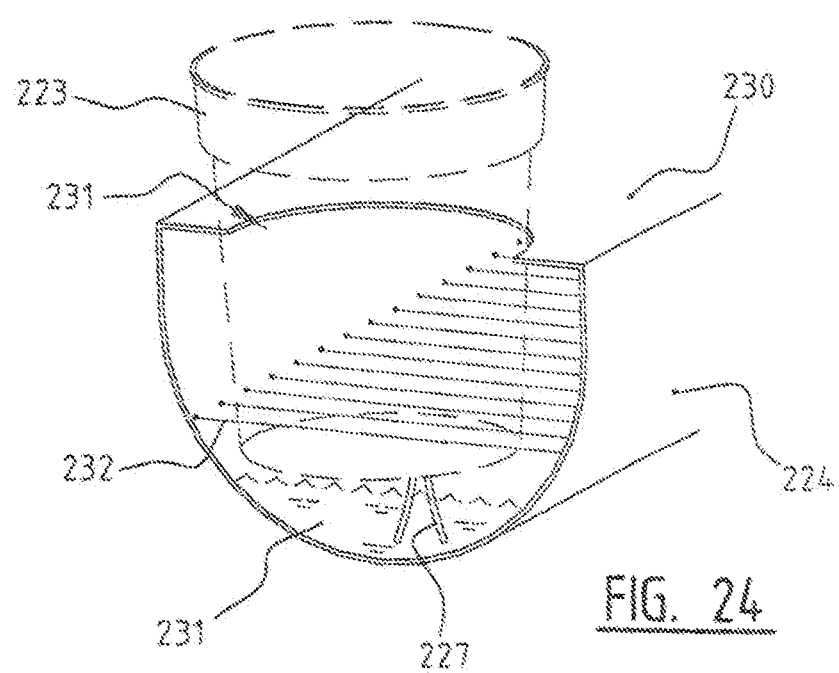
FIG. 24 shows a schematic perspective view of an alternative configuration relative to FIG. 23.

In FIGS. 22, 23 and 24 a display and transport device 220 is shown, comprising a preferably collapsible frame 221 and a plurality of trough-like supports 222, 224 for accommodating plant pots 223. On the frame 221, trough-like supports of different dimensions can be arranged. For instance, the higher trough-like support 222 can be relatively small, especially in relation to the lower arranged trough-like support 224, where the higher support 222 is intended for smaller plant pots 223 and consequently also smaller plants, than the bigger, wider and deeper trough-like support 224, which is lower down on the frame 221.

At a point of sale, water 225 can be added to the support 222 or 224, to accommodate a plant pot 223 with the bottom thereof submerged, or at least a wick extending from the bottom of the plant pot 223 into the water 225.

The supports 222, 224 are provided with resilient flaps along the edges thereof, which resiliently press against a plant pot 223, when inserted into or on the supports 222, 224. The resilient forces exerted by these flaps 226 serve to keep the plant pot 223 in FIG. 23 upright. In FIG. 23, at the free ends of the resilient flaps 226 angled carrier elements 228 are provided to support plant pots 223 above the level of water 225.

Figure 25:
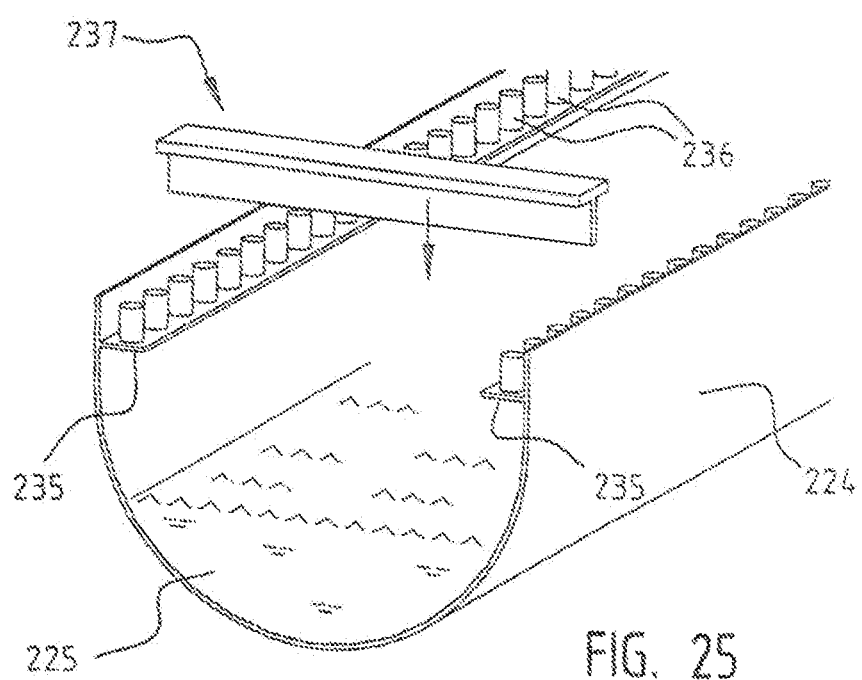
FIG. 25 shows a further alternative embodiment, exhibiting similar features relative to trays in FIGS. 12 10 and 13.

The resilient flaps 226 may be replaced by configurations that could resemble cap holders or the like, to insert the bottom of plant pots 223 therein to submerge only the wick 227 extending from the bottom of the plant pots 223 in the water 225, or to at least allow the wick 227 to be in contact with the water 225. In FIG. 24 a cover 230 is arranged over the trough like support 224, where holes 231 are arranged, in the cover 230. Additionally or alternatively, the trough like support 224 as shown in FIG. 24 may comprise a grating 232 or the like to support above the top level of the water 225 the bottoms of plant pots 223 arranged therein. In FIG. 25, and embodiment is shown exhibiting similar features as a tray in FIGS. 12 and 13, where the trough like support 224 comprises shoulders 235 carrying protrusions 236, between which T-shaped profiles 237 can be inserted to define there between a predetermined distance corresponding with plant pot sizes, to support plant pots of differing or varying sizes adjustably, in particular under a rim thereof.

Figure 29:
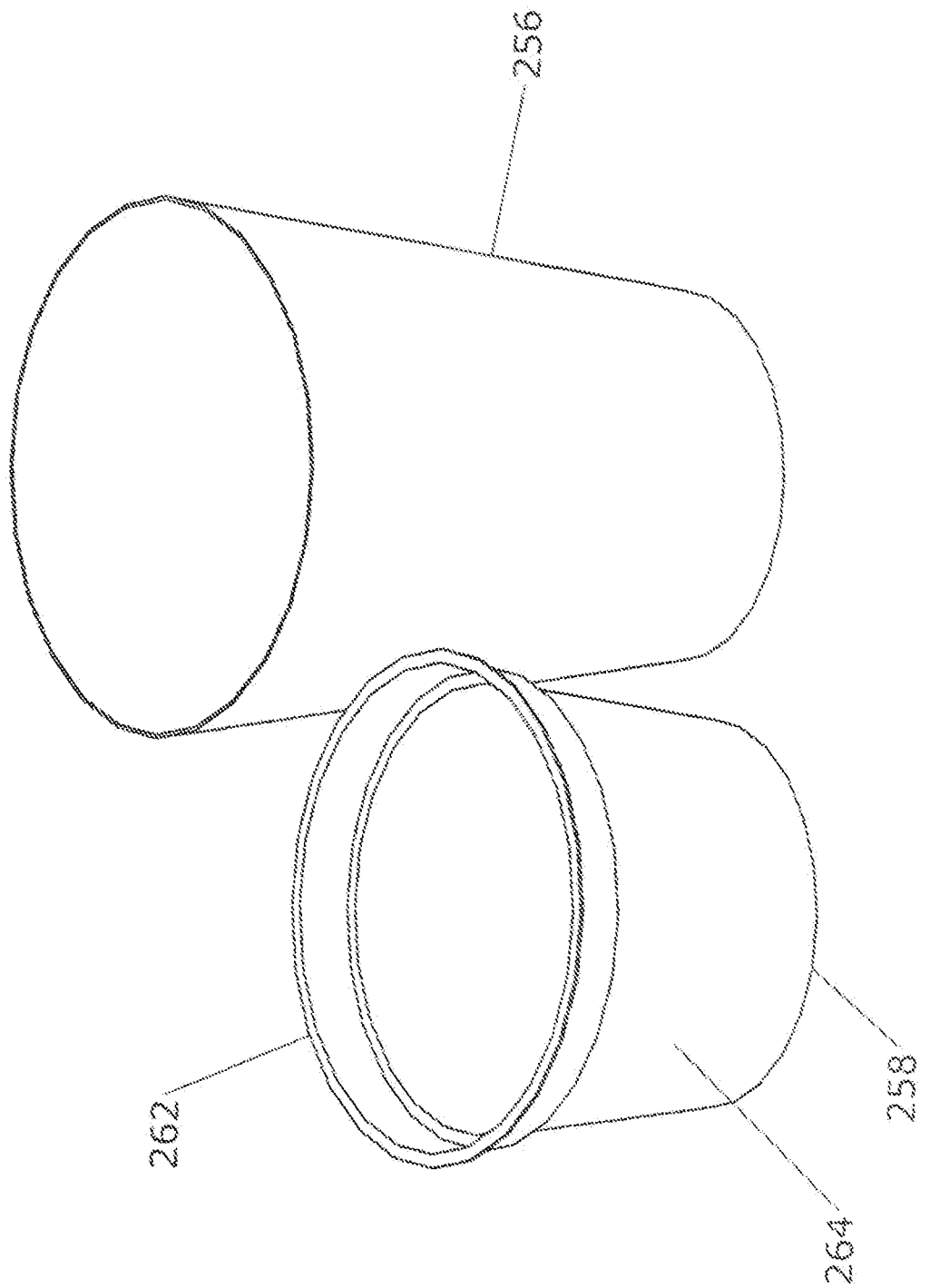
FIG. 29 is a perspective view, showing still another embodiment of a plant pot and corresponding container.
Figure 30:
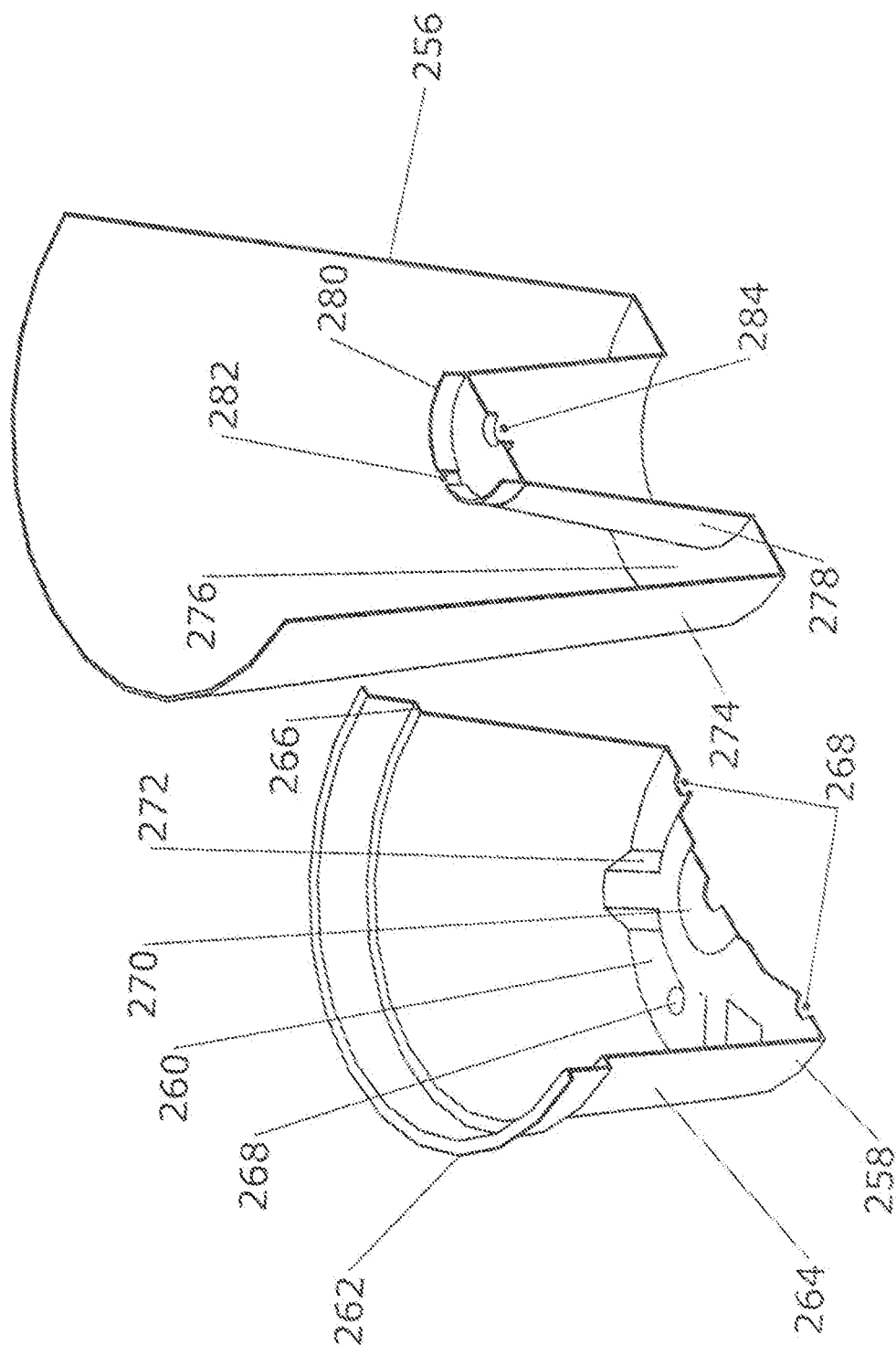
FIG. 30 is a perspective view with a cutaway, showing internal details of the plant pot and container shown in FIG. 29.

FIGS. 29-36 illustrate still another embodiment of a plant containment system that is well-suited for use with an ebb and flood system or other watering arrangement. FIG. 29 shows plant pot 258 and corresponding container 256. FIG. 30 shows a cutaway view in which the plant pot and container of FIG. 29 have been cut in half to reveal internal details. The embodiments of the plant pot and container shown in FIGS. 29 and 30 share many features in common with the embodiments shown in FIGS. 7-9.

For example, plant pot 258 includes bottom 260, side wall 264, side step 266, and circumferential top flange 262. It may or may not include channels 26, and in fact the particular version shown in FIG. 30 does not include these channels. Bottom 260 opens into a series of holes 268. Stiffening ribs 272 are preferably added between raised central portion 270 and side wall 204 in order to stiffen the bottom.

Container 256 includes bottom 276 joined to side wall 274. It also includes an overflow that allows water into and out of the container. The flow of water through the overflow is controlled in the invention by a valve (described in more detail subsequently). The presence of this valve is in fact a significant component in the present invention.

The overflow and valve may be located in any suitable position in the container in the embodiment of FIG. 30, the overflow 284 is located in central tower 273. Central tower 278 extends upward from bottom 276, and overflow 284 is located in the upper portion of this central tower.

Support ring 280 surrounds overflow 284. It opens into one or more gaps 282, through which water can flow. In reviewing the geometry shown in FIG. 30, those skilled in the art will realize that the position of overflow 284 and gap 282 define a reservoir of retained water within container 256. Once the water in the container reaches this level, any additional water will flow out through overflow 284. Overflow 284 may also be used to admit water to the container, such as when the container is placed in an ebb and flow irrigation system.

Figure 31:
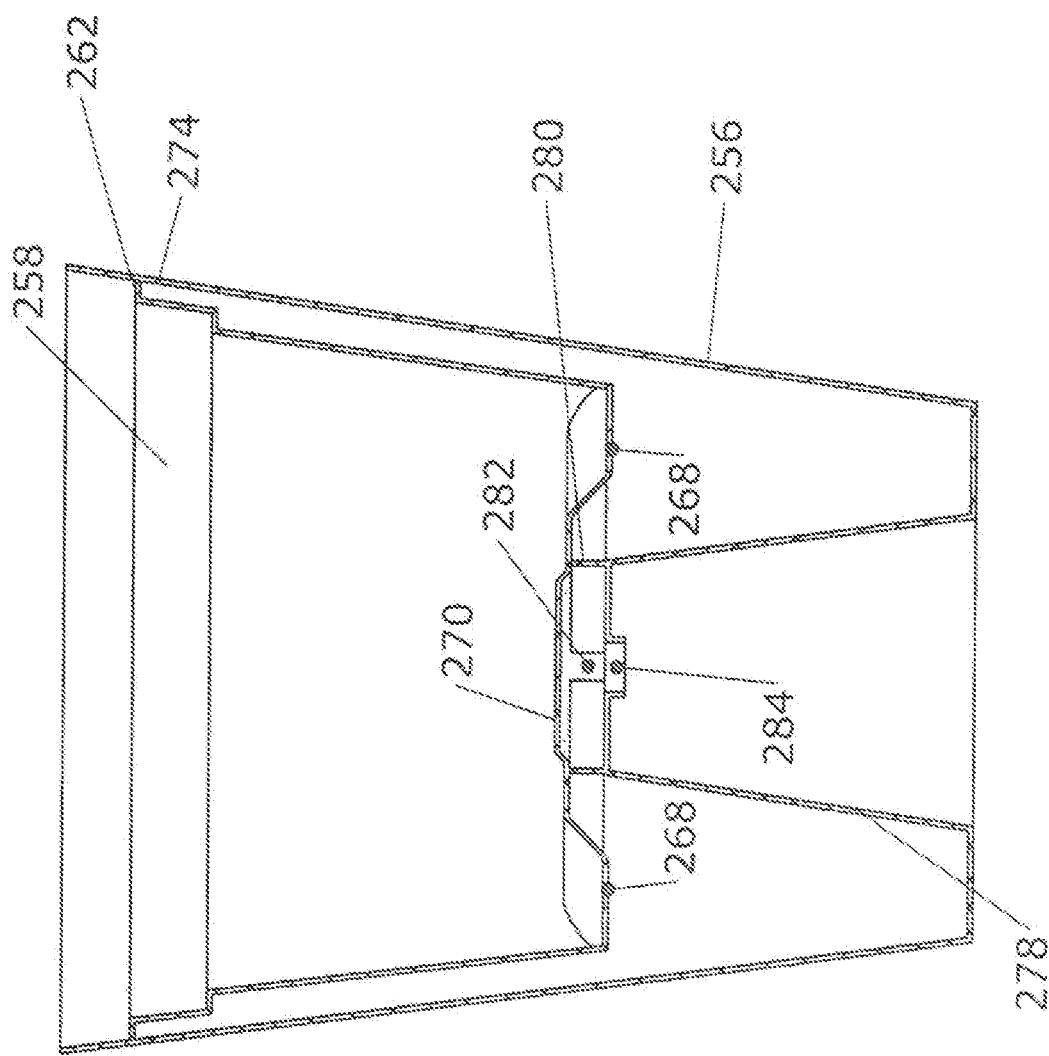
FIG. 31 is a sectional elevation view, showing an assembly of the plant pot and the container.

FIG. 31 shows a sectional elevation view through an assembly of plant pot 258 and container 256. The reader will observe how raised central portion 270 rests on support ring 280. The reader will also note how top flange 262 fits inside the tapered side wall 274 of container 256.

The result is a stable assembly of the plant pot within the container. The height of central tower 278 determines the height of overflow 284 and ultimately the amount of water that will be retained within container 256.

Figure 32:
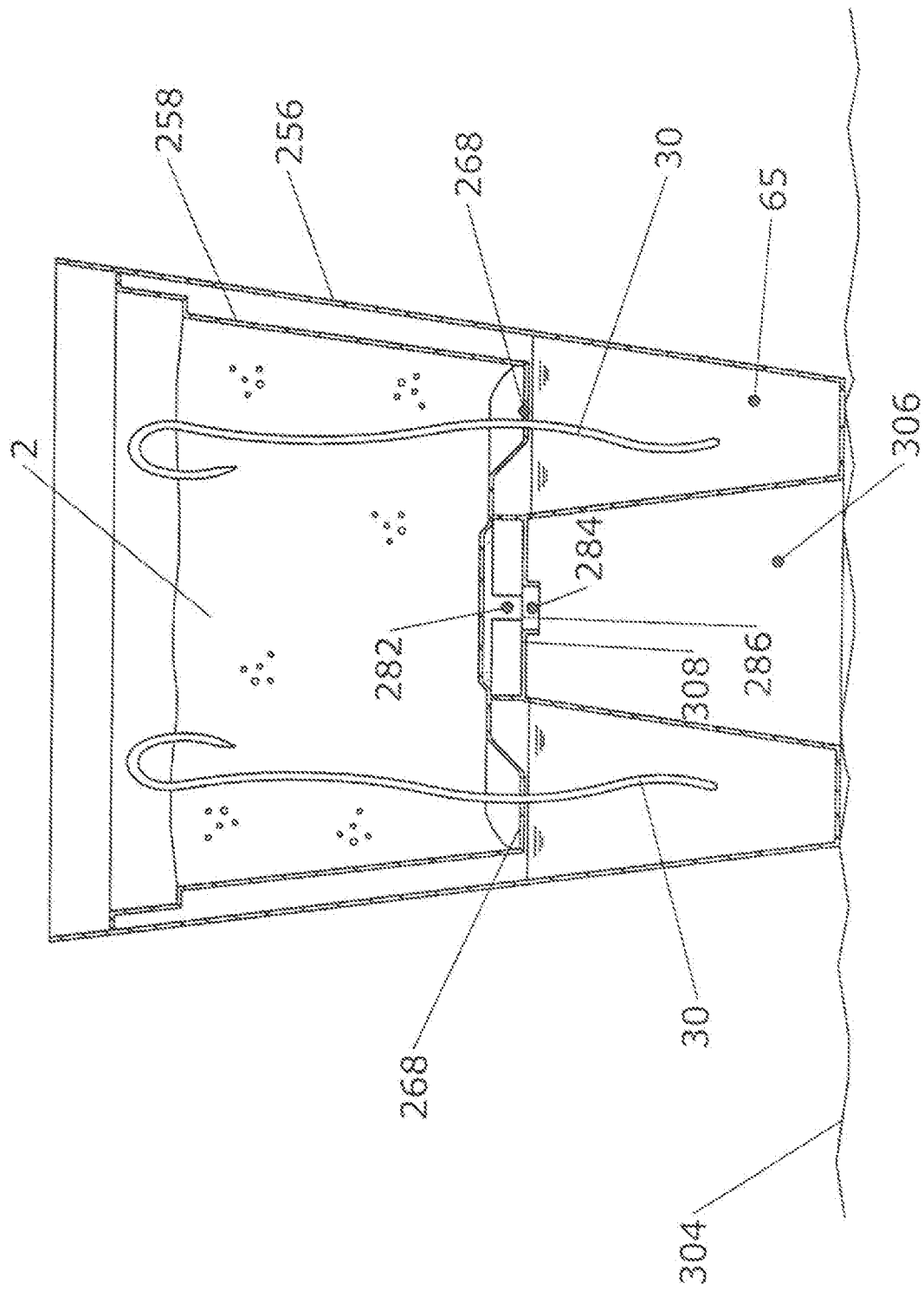
FIG. 32 is a sectional elevation view, showing the assembly of FIG. 31 with, the addition of soil and a pair of wicks.

FIG. 32 shows the same assembly of plant pot and container in a configuration that is actually used for growing a plant. Soil 2 has been added to plant pot 258, One or more wicks 30 are preferably added as well. As for the prior examples, a portion of each wick lies within the plant pot and a portion extends through a particular hole 268 and down into water supply 65 contained in container 256.

Container 256 sits on floor 304, which is typically rough concrete. The operation of the assembly in an ebb and flood system may be understood with respect to FIG. 32. The assembly shown will often be one of many such assemblies placed in a tray 70 such as shown in FIG. 7. The tray-surrounding the assembly is flooded to a level above overflow 284 and the lowest portion of gap 282 (The bottom of gap 282 is actually coplanar with the upper portion of horizontal wall 308 in the example shown). Water seeps under the bottom of container 256 and floods central cavity 306 (This is true even when the container is placed on a smooth metal surface, as even in that case the water will seep through into central cavity 306). The water then flows in through overflow 284 and gap 282. The water then floods the annular recess in the container surrounding central tower 278.

The water level within the assembly will continue to rise until it reaches the level within the surrounding tray of the ebb and flood system. An outflow opening for the ebb and flood tray will be opened at some point and the water surrounding the plant pot and container will recede. Excess water within the assembly will flow out through gap 282 and overflow 284 until the water within water supply 65 is level with the lowest portion of gap 282 (which, in this example, is coplanar with horizontal wall 308 and overflow 284). The lowest, obstruction between the water in water supply 65 and the overflow is labeled as overflow level 286.

Overflow level 286 constitutes a "defined overflow level" for the assembly shown. The term "defined overflow level" means a level of water resulting in the container when the container is flooded to a level above that shown in FIG. 32 and the water surrounding the container recedes. The excess water in the container will flow out until it reaches overflow level 268, at which point it will stop flowing out.

Water within water supply 65 is wicked up into soil 2 by one or more wicks 30, as described previously. The reader will thereby appreciate that water added to the assembly will eventually come to the defined overflow level (overflow level 286). If more water is added, it will simply run out overflow 284.

The operation of the assembly has been described with respect to an ebb and flood system. However, it will function well with many other types of watering systems. For instance, the assembly functions well where a user simply pours water into the open top of the plant pot. If too much water is added, the excess will run out overflow 284 and overflow level 286 will be established. The same level would be established by using a tube-based irrigation system.

The reader will thereby appreciate the advantages of locating overflow 284 in a central tower in the container. The aesthetic appeal of the assembly is not diminished by the overflow since it is not visible, yet the functionality of the overflow remains intact.

In some Instances, however, the overflow is undesirable. One example is during the shipment of the assembly to a point of sale. The grower fills water supply 65 to a level as shown, in FIG. 32. This level is preferably calculated to provide the plant with, a suitable water supply for the anticipated duration of shipment. However, during the motion inherent in the shipping, a significant percentage of the water may "slosh" out through overflow 284. It is therefore desirable to provide a seal for the overflow.

Figure 33:
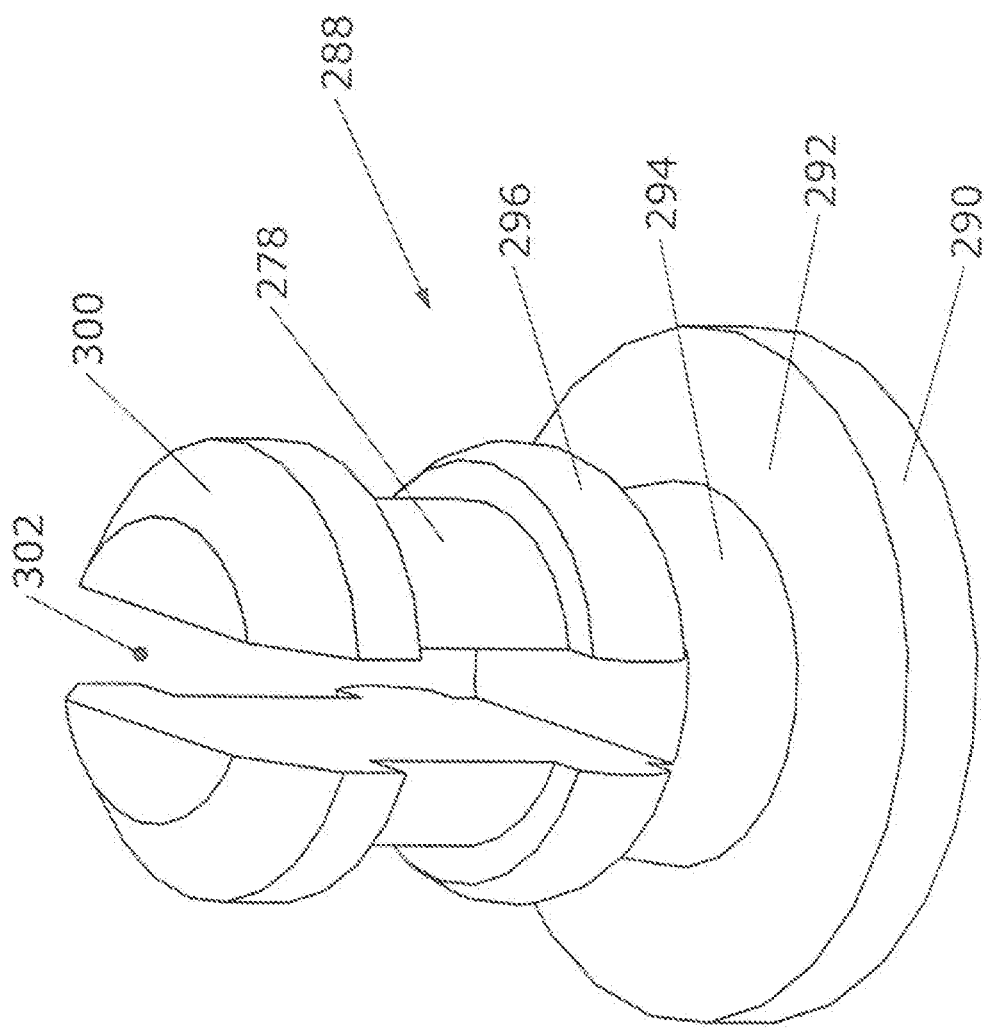
FIG. 33 is a perspective view, showing a sealing plug made according to the present invention.

FIGS. 33-36 depict an embodiment including a valve placed in the overflow. The valve selectively opens and closes the overflow. FIG. 33 shows the body of the valve-plug 288. Plug 288 is shown in an inverted state (inverted with respect to the orientation in which it is customarily used). Sealing plate 290 includes sealing surface 292. A complex protrusion extends from sealing surface 292. The protrusion contains several significant features. In sequence, these are: tapered plug 294, rib 296, cylinder 298, and retaining expansion 300. Transverse slot 303 extends laterally through at least the rib, the cylinder, and the retaining expansion. However, in the embodiment illustrated, the transverse slot does not extend all the way through the tapered plug.

Figure 34:
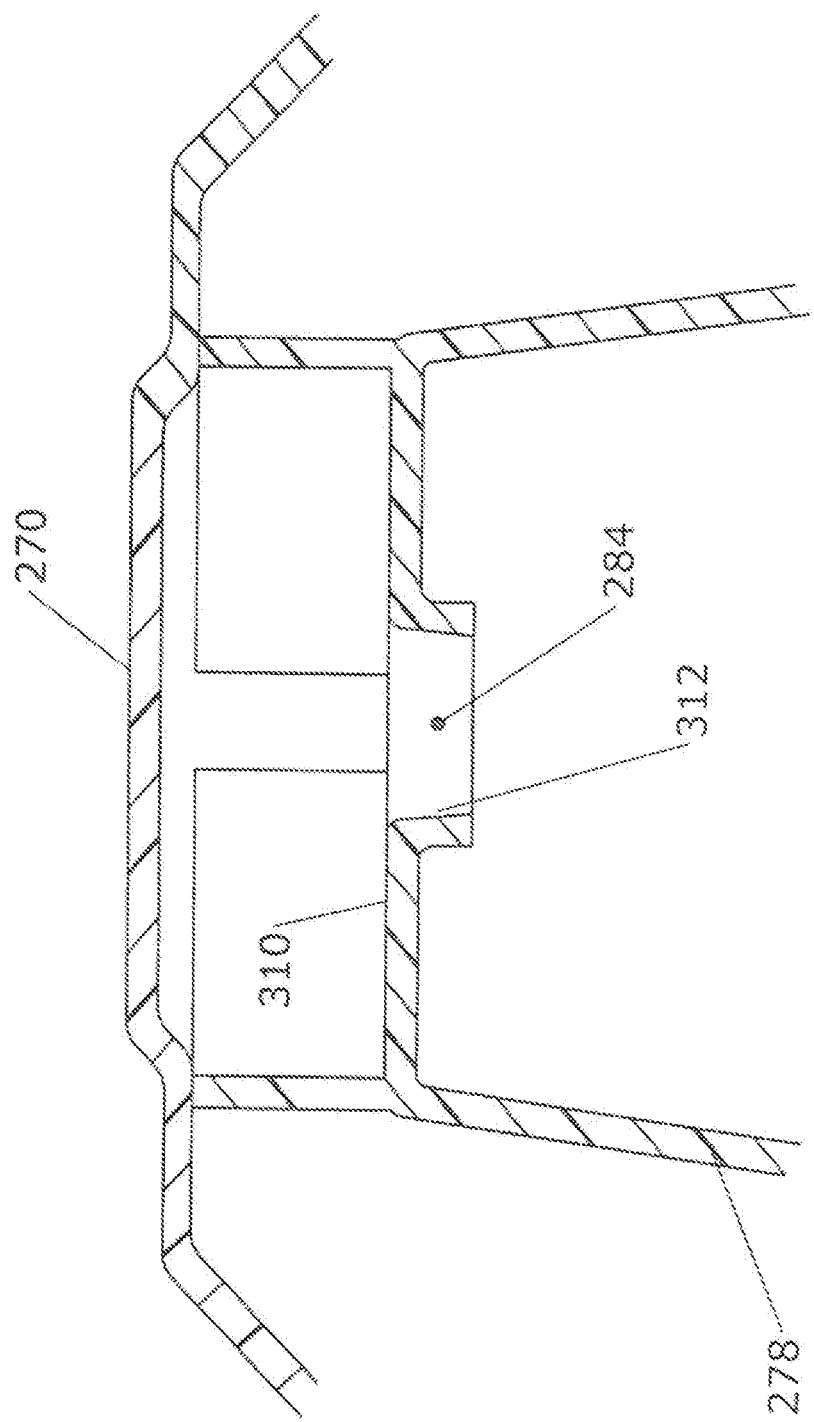
FIG. 34 is a sectional detail view, showing the area of the overflow in the container.

FIG. 34 shows the container geometry designed to receive plug 288 (and thereby create a functioning valve) in more detail. Horizontal surface 310 lies across the top of central tower 278. Overflow 284 is preferably surrounded by tapered side wall 312, The angle of tapered side wall 312 preferably matches the angle of tapered plug 294 shown in FIG. 33.

Figure 35:
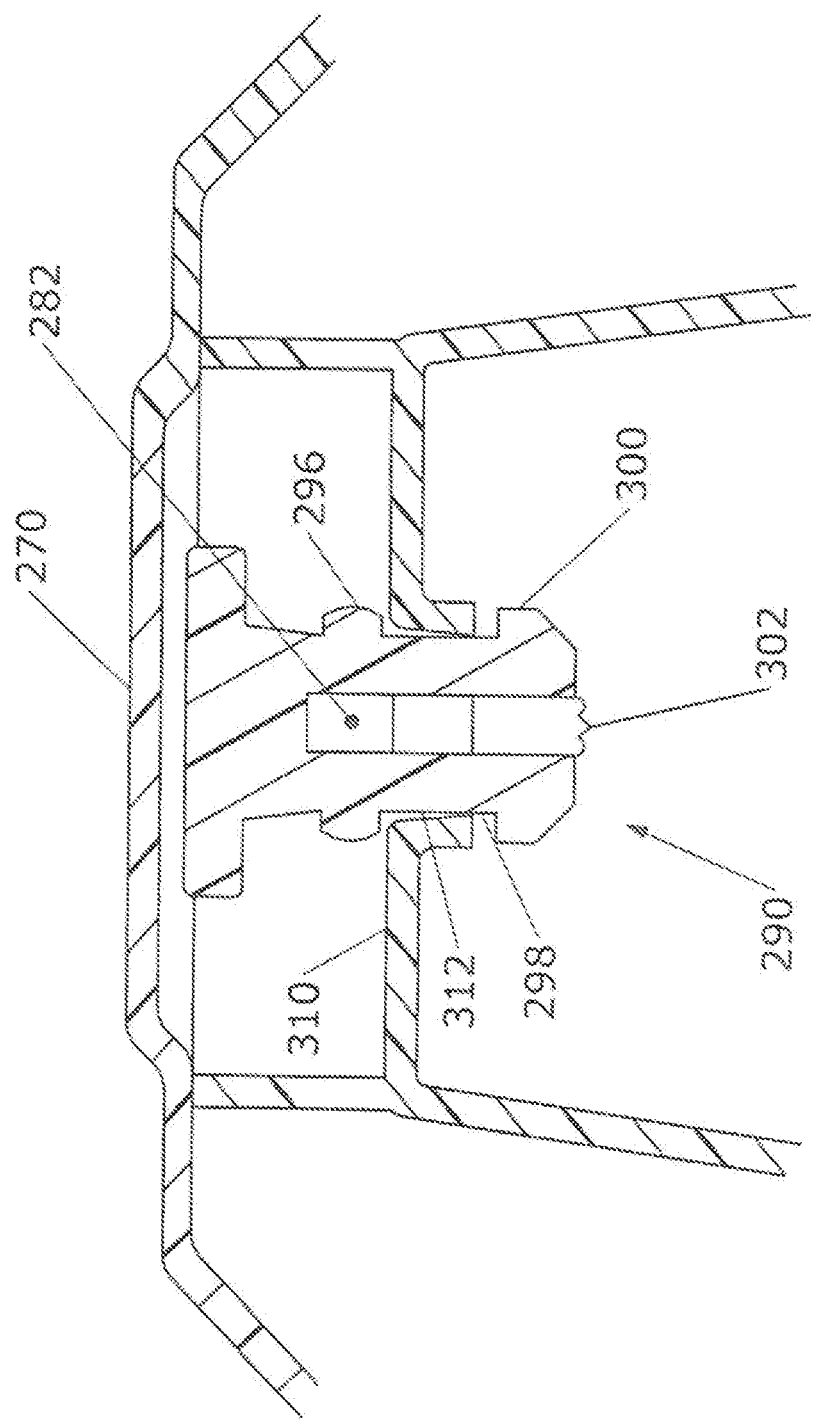
FIG. 35 is a sectional detail view, showing the area of the overflow with a sealing plug in the "open" position.

FIG. 35 is a sectional elevation view showing sealing plug 288 in position within overflow 284. The plug may be switched between an "open" position in which water can flow through overflow 284 and a "closed" position in which flow is prevented. FIG. 35 shows the "open" position.

Rib 236 lies above horizontal surface 310, and the interference between the two tends to prevent the sealing plug moving further downward. Cylinder 298 forms a sliding fit with tapered side wall 312.

Retaining expansion 300 lies below the lowest extent of tapered side wall 312, The retaining expansion tends to prevent the sealing plug being pulled upward and completely out of overflow 284, since it will have to be compressed to pass through the overflow.

In the open position as shown in FIG. 35, the presence of transverse slot 302 allows water to pass through sealing plug 288 (and therefore through overflow 284). Water passing into the container will flow into the volume inside support ring 280. It will then flow beyond the support ring through gap 282. In the view of FIG. 35, transverse slot 302 and gap 282 are aligned, but the flow will still occur even, if gap 282 and transverse slot 302 are not aligned. Transverse slot 302 allows water to flow into or out of the volume contained within support ring 280. The water will "find its way" through a gap or gaps provided in the support ring and into the interior of the container.

In order to seal overflow 284, the user pushes down on the sealing plug to transition it to the "closed" position. The plant pot may be removed to provide easy access to the sealing plug. The user then presses down on sealing plate 290. The downward pressure forces rib 296 through and past tapered side wall 312.

The result is shown in FIG. 36. Once the rib descends past the tapered side wall, tapered plug 294 comes to rest against the tapered side wall. This interaction acts like a stopper in a drain. Further, sealing surface 292 presses down against horizontal surface 310 producing another seal. The reader will note that transverse slot 302 in the sealing plug no longer provides a passage for water. Its uppermost extreme does not extend beyond tapered side wall 312.

Further downward motion of the plug is prevented by sealing surface 292 coming to rest on horizontal surface 310. However the user may return the plug to the "open" position by bending upward a portion of the perimeter of sealing plate 290 and pulling the plug upward. The plug will then snap back into the position shown in FIG. 35. However, absent a force prying the plug upward, it is retained in the position shown in FIG. 36 by rib 296 lying below the lower extent of tapered side wall 312.

The sealing plug is preferably made of a flexible material such as silicon rubber. Such a material provides a suitable frictional engagement while also providing a water-tight seal. The presence of transverse slot 302 also permits an appropriate amount of deflection in order for the plug to pop into the two stable positions shown in FIGS. 35 and 36.

The use of flexible material—in combination with the geometry of the plug—means that the plug may be installed and removed without the use of any tools. The plug is installed initially by pressing it into place. It is switched between the open and closed positions by pushing it down or pulling it up. The inclusion of retaining expansion 300 means that the plug is not likely to become separated from the container.

The ability to selectively open and close the plug provides an advantage during shipping and any subsequent sales display. The plug will customarily be pressed closed during shipping. However, once the assembly of the plant pot and container arrives at a point of sale, it may be desirable to open, the plug again in order to take advantage of available irrigation systems.

FIGS. 22 and 23 show exemplary display systems that also provide irrigation. The plant pot/container assembly of FIG. 32 may be placed in a support such as shown in FIG. 23, The sealing plug is pulled upward to the "open" position before the assembly is placed in the support. Water will then foe added up to and beyond overflow level 286 so that water flows into the container through overflow 284.

When the plant is sold, the sealing plug may be pressed back to the "closed" position. The buyer then waters the assembly normally by pouring water into the open top of the plant pot (the assembly being shown in FIG. 32). Water will flow down through the holes 268 and accumulate as water supply 65. The wicks will then carry the water—at a suitable rate—back up into soil 2. The assembly may also be used in a system that does not include wicks, such as by extending the defined overflow level to a point above the bottom of the plant pot.

Many other alternative configurations may also turn out to be fruitful or effective, which should all be considered within the realm of possibilities, chat would immediately spring to mind to the skilled person, after having been confronted with the foregoing description and accompanying drawings. For example, although the exemplary embodiments have shown the overflow and valve being located in a central tower, they could also be located in the side wall of the container itself. The other additional and alternative embodiments all within the scope of protection of the present invention according to the accompanying claims, and are in this sense to be considered embodiments of the present invention.

We claim:

1. A plant pot assembly, comprising:
   (a) a container including,
      (i) a container bottom,
      (ii) a container side wall extending up from said container bottom to a container top, with said container bottom and said container side wall combining to form a container interior,
      (iii) a central tower extending up from said container bottom,
      (iv) an overflow opening in said central tower proximate a top of said central tower, with said overflow opening fluidly connecting said interior of said container to an exterior of said container,
      (v) a support ring extending upward from said central tower around said overflow opening, said support ring having an upper extreme and a gap;
   (b) a plant pot, including,
      (i) a plant pot bottom,
      (ii) a plant pot side wall extending up from said plant pot bottom, with said plant pot bottom and said plant pot side wall combining to form a plant pot interior,
      (iii) a hole through said plant pot bottom;
   (c) wherein said plant pot bottom rests upon said upper extreme of said support ring, with said support ring thereby creating a vertical space between said central tower and said plant pot bottom;
   (d) wherein said plant pot side wall nests within said container side wall;
   (e) a movable plug positioned in said overflow opening, said movable plug being movable between a first raised position wherein said movable plug allows flow through said overflow opening and a second lowered position wherein said movable plug prohibits flow through said overflow opening; and
   (f) wherein said support ring is sufficiently tall so that said vertical space allows said movable plug to be in either said first or second positions while said plant pot rests on said upper extreme of said support ring.

2. The plant pot assembly as recited in claim 1, wherein:
   (a) said central tower has a horizontal wall; and
   (b) said overflow opening is located in said horizontal wall.

3. The plant pot assembly as recited in claim 1, wherein said container includes a liquid reservoir below said overflow opening.

4. A plant pot assembly, comprising:
   (a) a container including,
      (i) a container bottom,
      (ii) a container side wall extending up from said container bottom to a container top, with said container bottom and said container side wall combining to form a container interior,
      (iii) a central tower extending up from said container bottom,
      (iv) an overflow opening in said central tower proximate a top of said central tower, with said overflow opening fluidly connecting said interior of said container to an exterior of said container,
      (v) a support ring extending upward from said central tower around said overflow opening, said support ring having an upper extreme and a gap;
   (b) a plant pot, including,
      (i) a plant pot bottom,
      (ii) a plant pot side wall extending up from said plant pot bottom; with said plant pot bottom and said plant pot side wall combining to form a plant pot interior,
      (iii) a hole through said plant pot bottom,
      (iv) a top flange extending outward from a top of said plant pot side wall;
   (c) wherein said plant pot bottom rests upon said upper extreme of said support ring, with said support ring thereby creating a vertical space between said central tower and said plant pot bottom;
   (d) wherein said plant pot side wall nests within said container side wall;
   (e) wherein said plant pot bottom and said top flange are configured so that said top flange contacts said container side wall, proximate said container top, as said plant pot bottom rests upon said upper extreme of said support ring, thereby creating a stable configuration of said plant pot within said container;

(f) a movable plug positioned in said overflow opening, said movable plug being movable between a first raised position wherein said movable plug allows flow through said overflow opening and a second lowered position wherein said movable plug prohibits flow through said overflow opening; and wherein said support ring is sufficiently tall so that said vertical space allows said movable plug to be in either said first or second positions while said plant pot rests on said upper extreme of said support ring.

5. The plant pot assembly as recited in claim 4, wherein:
(a) said central tower has a horizontal wall; and
(b) said overflow opening is located in said horizontal wall.

6. The plant pot assembly as recited in claim 4, wherein said container includes a liquid reservoir below said overflow opening.

* * * * *